United States Patent
Furze et al.

(10) Patent No.: US 12,488,487 B1
(45) Date of Patent: Dec. 2, 2025

(54) METHOD AND SYSTEM FOR ANALYZING DURABILITY OF GOLF BALL

(71) Applicant: Acushnet Company, Fairhaven, MA (US)

(72) Inventors: Paul Furze, Tiverton, RI (US); Leonidas Amarant, Middletown, RI (US)

(73) Assignee: Acushnet Company, Fairhaven, MA (US)

( * ) Notice: Subject to any disclaimer, the term of this patent is extended or adjusted under 35 U.S.C. 154(b) by 386 days.

(21) Appl. No.: 18/321,012

(22) Filed: May 22, 2023

(51) Int. Cl.
   *G06K 9/00* (2022.01)
   *A63B 37/00* (2006.01)
   *G06T 7/64* (2017.01)

(52) U.S. Cl.
   CPC ............ *G06T 7/64* (2017.01); *A63B 37/0006* (2013.01); *A63B 2225/02* (2013.01); *G06T 2207/20024* (2013.01); *G06T 2207/30224* (2013.01)

(58) Field of Classification Search
   CPC ............ G06T 7/64; G06T 2207/20024; G06T 2207/30224; A63B 37/0006; A63B 2225/02
   See application file for complete search history.

(56) References Cited

U.S. PATENT DOCUMENTS

| | | | |
|---|---|---|---|
| 6,031,933 A * | 2/2000 | Kumagai | A63B 37/0004 356/426 |
| 6,594,623 B1 | 7/2003 | Wang et al. | |
| 6,597,445 B2 * | 7/2003 | Sugimoto | A63B 45/00 451/6 |
| 6,630,998 B1 * | 10/2003 | Welchman | G01N 21/951 382/141 |
| 7,150,178 B2 * | 12/2006 | Bissonnette | G01N 3/52 73/12.02 |
| 7,170,592 B2 * | 1/2007 | Mydlack | G01N 21/951 356/394 |
| 7,771,776 B2 * | 8/2010 | Furze | B05D 1/00 427/9 |
| 2004/0247170 A1 * | 12/2004 | Furze | G01N 21/951 382/141 |
| 2006/0122007 A1 * | 6/2006 | Savarese | G06K 19/07758 473/351 |

FOREIGN PATENT DOCUMENTS

| | | | | |
|---|---|---|---|---|
| KR | 102347674 B1 | * | 1/2022 | G01N 3/30 |
| TW | I745946 B | * | 11/2021 | G06T 1/40 |

OTHER PUBLICATIONS https://www.keyence.com/ss/products/vision/visionbasics/basic/filter/—"Image Enhance Filters—Keyence America" (Published Sep. 17, 2021, Accessed May 11, 2023) (14 pages).

(Continued)

*Primary Examiner* — Shervin K Nakhjavan
(74) *Attorney, Agent, or Firm* — Thomas P. Gushue

(57) ABSTRACT

A method, technique, and/or system for determining the durability of a golf ball, and more particularly the durability of a cover of a golf ball is disclosed herein. The present disclosure provides an objective technique for scoring or rating the durability of golf balls such that a uniform scoring methodology can be used. The present disclosure uses imaging techniques and image processing techniques to analyze damage to a golf ball surface.

20 Claims, 18 Drawing Sheets

(56) References Cited

OTHER PUBLICATIONS https://www.keyence.com/ss/products/vision/visionbasics/basic/size/—"Basics of Dimension Inspection—Keyence America" (Published Jul. 6, 2022; Accessed May 11, 2023) (8 pages).
https://www.mvtec.com/doc/halcon/11/en/highpass_image.html—"HALCON Operator Reference—highpass_image (Operator)" (Published Apr. 16, 2018; Accessed May 11, 2023) (3 pages).
https://www.mathworks.com/help/signal/ref/highpass.html—"MathWorks Help Center—highpass—Highpass-filter signals" (Published Dec. 1, 2022; Accessed May 11, 2023) (10 pages).
https://www.mvtec.com/doc/halcon/13/en/check_difference.html—"HALCON Operator Reference—check_difference (Operator)" (Published May 19, 2022; Accessed May 11, 2023) (3 pages).
https://www.mathworks.com/help/images/ref/imabsdiff.html—"MathWorks Help Center—imabsdiff—Absolute difference of two images" (Published Oct. 12, 2022; Accessed May 11, 2023) (3 pages).
https://www.mvtec.com/doc/halcon/13/en/mean_image.html—"HALCON Operator Reference—mean_image (Operator)" (Published Mar. 2, 2021; Accessed May 11, 2023) (3 pages).
https://www.mathworks.com/help/images/ref/mean2.html—"MathWorks Help Center—mean2—Average or mean of matrix elements" (Published Dec. 8, 2021; Accessed May 11, 2023) (2 pages).

\* cited by examiner

METHOD AND SYSTEM FOR ANALYZING DURABILITY OF GOLF BALL

FIELD OF THE INVENTION

This disclosure generally relates to a method and system for analyzing a golf ball, and more particularly relates to a method and system for analyzing durability of a golf ball cover or surface.

BACKGROUND OF THE INVENTION

Improving the durability of a golf ball is generally desirable to preserve the useful life of the golf ball. Because golf balls are specifically designed to undergo multiple impacts and strikes, it is important that the golf ball's outer surface, such as a cover, can withstand being struck multiple times without being mutilated or disfigured or while maintaining some desired level of playability.

Accurate durability testing of a golf ball or golf ball cover can be difficult due to the subjective nature of ascertaining a level of damage to the golf ball, and the challenge of trying to uniformly and objectively analyze multiple golf ball samples that have experienced unique damage patterns.

It would be desirable to provide a more reliable, uniform, and objective analysis system and method for analyzing golf ball durability.

SUMMARY OF THE INVENTION

In some embodiments, the present disclosure provides a solution for objectively determining the severity of damage that has been inflicted on a golf ball, and thereby provides a reliable configuration to determine the durability of the golf ball.

The present disclosure provides a method and a system that is configured to provide a quantitative based solution for analyzing scans, images, or other information related to a golf ball that has been damaged, and determining the overall durability of the golf ball. Imagery of the golf ball and its surface can be analyzed using various machine vision techniques and solutions, in some examples.

Various criteria can be used in this analysis, such as how severe the damage is to the golf ball. The damage to the golf ball can be analyzed according to a variety of parameters, such as the size or area of discrete damaged areas, the quantity of discrete damaged areas, the depth or height of damaged areas, etc. In one aspect, these parameters can be considered durability parameters. Noise reduction techniques or functions can be applied to the data obtained by the imager to identify damaged areas more precisely. Image processing techniques can be applied to the image in order to detect the size and quantity of damaged areas.

Further granularity can be provided via the present disclosure through the inclusion of thresholds that can be applied to the data or images from the analysis, which can provide further evaluation criteria or ratings to aid in the analysis of the durability of the golf ball.

In one example, a method of determining durability of a golf ball having an outer surface with a plurality of dimples is provided herein. The method comprises applying a damaging treatment to the golf ball to mar at least a portion of the outer surface of the golf ball. The method comprises scanning the outer surface of the golf ball via an imager to acquire at least one first initial image of the golf ball. The image or data related to the golf ball can be very detailed and be provided in various forms, including both visual based data/information (i.e., images), text or data-based information, height deviation or profile plots, and any other type of file, data, information, etc.

The method comprises applying a high-pass filter, such as a high-pass filter process, technique or function, to the at least one first initial image to generate at least one first filtered image and/or at least one first filtered dataset and/or at least one first plot. One of ordinary skill in the art would understand that the term image can mean a file or data element, and can also include an associated data or text file. The filter can be a software or hardware enabled or implemented tool, in one example. The terms high-pass filter and high-pass filter function are used interchangeably herein. The filtering technique can include obtaining a smoothed signal associated with the data captured by the scans or images, and comparing the smoothed signal to an original or raw signal associated with the data captured by the scans or images. In one aspect, an initial plot of the height profile of the golf ball surface is compared to another plot of the height profile of the golf ball surface following a damaging treatment. A comparison of the plots can yield detailed information regarding marring or shear damage to the golf ball surface that has been induced by the damaging treatment, while the filtering technique can be applied to the plots to reduce or mute changes in the plot of the height profile that are due to dimples or other inherent golf ball surface geometry features.

The high-pass filter can be configured to attenuate signals associated with a first subset of surface height deviations due to dimples and curvature of golf ball, and pass through signals associated with a second subset of surface height deviations due to marring from the damaging treatment. The filter can be adjusted to target or identify areas above or below predefined thresholds.

The method can further comprise determining durability of the golf ball based on an extent of marring in the at least one first filtered image. The durability of the golf ball can be graded via a durability grading system or durability parameters. Objective analysis of the golf ball's durability can be achieved based on the use of precise imaging tools in conjunction with image processing and filtering techniques, such that reliable analysis based on quantifiable parameters is provided.

The high-pass filtered image can be further processed or analyzed such that a plurality of thresholds can be applied to highlight, identify, or emphasize areas of the image that are above a certain threshold brightness. The thresholds can be applied using a variety of threshold settings each having a different threshold such that varying degrees of marring can be filtered based on the plurality of threshold settings. The plurality of threshold settings can comprise at least: a first threshold setting corresponding to a lowest damage condition, a second threshold setting corresponding to a low or low-moderate damage condition, a third threshold setting corresponding to a high or high-moderate damage condition, a fourth threshold setting correspond to a highest damage condition, etc. One of ordinary skill in the art would understand any number of threshold settings can be used. The threshold settings can be based on the visual data captured via the image. For example, the threshold settings can be based on brightness values that are detected or captured in the image or filtered image. The method can further comprise assigning a durability grade based on relative quantities of discrete areas of the golf ball surface triggering or meeting each of the first, second, third, and fourth threshold settings. The thresholds can be directly applied to plots of the golf ball surface indicating surface height deviations that are caused due to the damaging treatment.

The method can further comprise determining at least one of the following durability parameters based on the at least one first filtered image: a total size of the damaged area on the golf ball, a quantity of discrete damaged areas on the golf ball, and/or a single largest damaged area size on the golf ball. The method can further comprise assigning a durability grade based on the durability parameters. Measurements for the sizes of the damaged areas can be based on pixel size, in one example. Image processing techniques can be configured to automatically detect the damaged areas based on differences in height, color, or other characteristics. The image processing techniques can further measure the size, dimensions, profiles, etc., of features that are identified in the image.

In one example, the imager has a resolution of at least 0.001 inches per pixel, and 0.001 inches per unit change in brightness. The resolution of the imager can be greater or less than these values. The imager can be a three-dimensional measurement imager.

The method can further comprise applying a moving average function to the image. Various other operators, functions, or processing techniques can be used.

Various other aspects and features of the present disclosure are disclosed herein.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
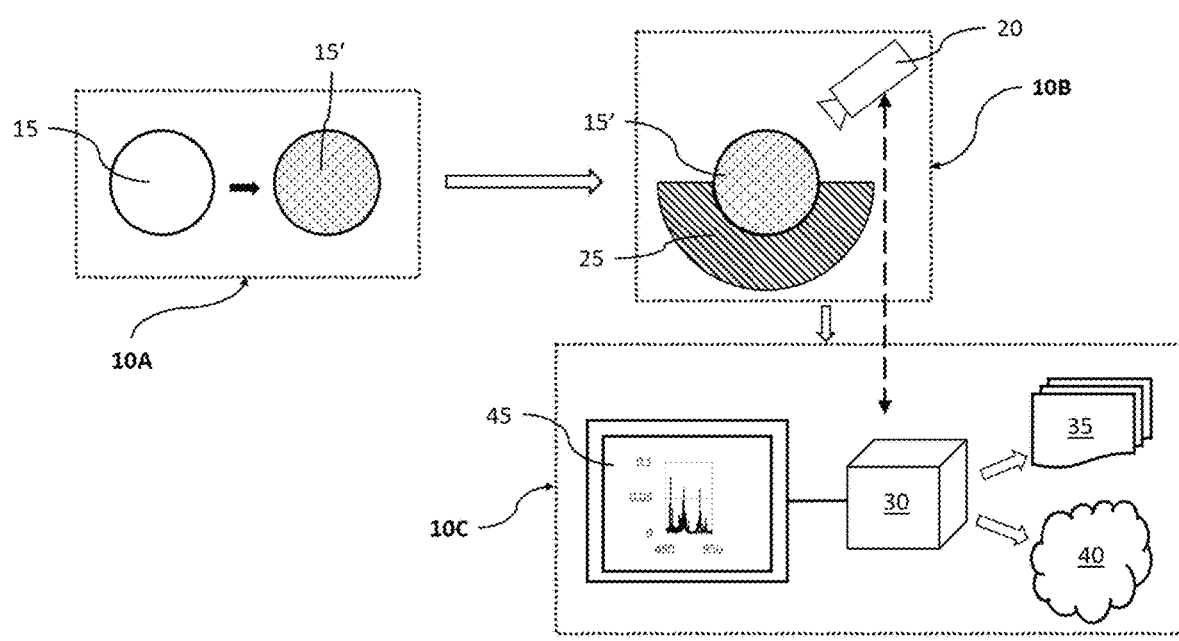
FIG. 1 is a schematic flow diagram indicating various steps of determining durability of a golf ball according to a first example.

According to some of the disclosed embodiments, a method and/or a system is provided herein that are generally configured to provide analysis of a golf ball. More specifically, the analysis can be directed to a surface of the golf ball. In one example, the analysis can be focused on the cover of the golf ball. This analysis is important to determine the overall durability of a golf ball, which is specifically intended to be repeatedly struck by a golfer. Therefore, it is important that the surface of the golf ball is durable enough to withstand multiple strikes during its lifetime and avoid any undesirable markings, scuffing, marring, tears, or other damage that can negatively impact the golf ball.

At least one method of determining durability of a golf ball having an outer surface with a plurality of dimples is provided. Generally, a golf ball is provided in a pristine or undamaged state. To determine characteristics of the golf ball, such as durability of the cover of the golf ball, a damaging treatment can be intentionally applied to the golf ball. Some exemplary ways to inflict this damage to the golf ball can include striking the golf ball with a golf club, firing the golf ball into a surface (i.e., grooved plate), striking the ball with a rotating arm hitting apparatus, or any other method that is configured to consistently apply a damaging strike or force to the golf ball.

While the damaging treatment can be designed or configured to specifically damage the cover of the golf ball, it is understood that the damaging treatment can damage additional layers of the golf ball. Additionally, the damaging treatment can be used on golf balls lacking covers or any type of golf ball construction. The damaging treatment generally is configured to inflict damage, marring, scuffing, blemish, defect, blotch, or any other irregularity or imperfection to a layer or surface of the golf ball.

In another aspect, the present disclosure can be adapted for use on golf balls that have been in ordinary play or circulation. The damaging treatment can occur naturally during ordinary use.

The intentional damaging treatment can be calibrated or designed to inflict damage to the golf ball based on previously obtained datasets or information regarding the amount of cycles to strike the golf ball, amount of force or impact used to strike the golf ball, etc. One of ordinary skill in the art would understand based on this disclosure that in some examples, the damaging treatment may cause very minimal damage or no damage to the golf ball, depending on the specific characteristics of the golf ball. In other examples, the damaging treatment can be configured to cause significant marring, damage, mutilation, or other disfigurement to the golf ball. The damaging treatment can include a single type of damaging step or multiple, different types of damaging steps that are used in combination with each other.

Different levels of damaging treatment can be used for different types of golf balls. One of ordinary skill in the art would understand that the damaging treatment can vary. For determining the durability of one type of golf ball versus another type of golf ball, the damaging treatment can be identical such that a comparative analysis can be performed.

After the damaging treatment is applied to the golf ball, at least one image of at least one damaged area on the golf ball is captured or obtained. In one configuration, at least one image of the golf ball can be obtained prior to the damaging treatment, i.e., a before image, and another image can be obtained after the damaging treatment, i.e., an after image. In another configuration, only an "after" image of the golf ball (i.e., an image of the damaged golf ball) is used for the analysis described herein. In this aspect, durability testing of a golf ball can be achieved without having to align the golf ball for two images and can instead be carried out based on a single image.

In one aspect, the image of the golf ball can comprise a wide area three-dimensional image or profile. In one example, an imager can be provided that is configured to obtain a two-dimensional or three-dimensional image or profile. Exemplary imagers or scanning systems can include the LJ-X Series Scanner or VR Series 3-D Optical Profilometer from Keyence® Corporation, the surfaceCONTROL 3D 2500 from Micro-Epsilon®, or the Zeta™-20 Optical Profiler from KLA Corporation. One of ordinary skill in the art would understand that other imaging and/or scanning equipment could be used.

In one aspect, a holding apparatus or stage assembly can also be provided that is configured to hold, rotate, move, or otherwise engage with the golf ball and/or the imager. In one example, the imager can have a resolution of at least 0.050 inches, or at least 0.010 inches, or at least 0.005 inches, or at least 0.001 inches. In one example, the imager can have a range in a vertical direction or Z-axis of at least 0.30 inches, or at least 0.25 inches, or at least 0.20 inches. In another example, the imager can have a range in the vertical direction or Z-axis of at least 0.84 inches. In another example, the imager can have a range in the vertical direction or Z-axis of at least half of an average golf ball diameter. In another example, the imager can have a range in the horizontal direction of at least an average golf ball diameter, i.e., at least 1.68 inches. One of ordinary skill in the art would understand that the resolution and ranges can be greater or less than the values listed herein.

After the image is obtained, the image can be preprocessed according to a variety of techniques and processes. One of ordinary skill in the art would understand based on the present disclosure that various functions, processing techniques and other data or information handling, storing, manipulation, etc., can be carried out or executed via a computing system, computer, processor, memory storage unit, and/or other electronic components. Exemplary machine vision software modules (also referred to herein as machine vision software, machine vision components, or simply machine vision) can include MVtec HALCON® from MVtec Software GmbH, VisionPro® from Cognex®, Matrox® Imaging Library (MIL) from Matrox® Imaging, MATLAB® Image Processing Toolbox from MathWorks®, etc.

Preprocessing steps can include alignment, calibration, measurements, comparisons, image analysis, image segmentation, registration, and/or other data analysis or displaying techniques. One of ordinary skill in the art would understand various functions can be carried out via a preprocessing module to analyze the data, plots, and/or images obtained from the imager. In one aspect, the imager can be configured to output an image file such as a JPEG, PDF, BMP, TIFF, PNG, etc. In one aspect, the imager can also be configured to output a data file, such as a CSV, XLS, TXT, etc. One of ordinary skill in the art would understand that any combination of images, datasets, plots, graphs, information, files, etc., can be transmitted and received between the imager and some type of associated computing system, processor, or other electrical components. The imager and the computing system can be connected via a wireless connection, a wired connection, or an internet-based or cloud-based connection, for example.

The data file can provide increased resolution, such as at least 32 bit-depth, so that relatively small height deviations along the golf ball surface can be detected and analyzed. Regardless of the specific type of output from the imager, the preprocessing module can be configured to receive and/or transmit data from the imager. The preprocessing module can be further configured to manipulate, analyze, display, evaluate, process, save, and/or carry out any other function regarding the data from the imager. The preprocessing module can further be configured to carry out filtering techniques, as well as noise reduction or noise cancellation techniques. The preprocessing module can be one aspect, component, feature, or element of the computer or computing system.

In one example, the image, plot, and/or data files can be analyzed using a machine vision process that is implemented via the preprocessing module, which is configured to detect and measure at least one of a degree, area, quantity, or extent of damage to the golf ball surface. In one aspect, the damage to the golf ball can include damage to the cover of the golf ball. For example, rough areas or scuff markings can appear on the cover of the golf ball. In another example, cuts, tears, scratches, nicks, punctures, or other more severe types of markings or marring can manifest on the golf ball. This type of damage can penetrate through the cover to an inner layer. Regardless of the type of marring or damage to the golf ball, the damage treatment will necessarily either cause an increase or decrease in the previous surface profile of the golf ball.

Due to the inherent features typically found on a golf ball, i.e., curved body with dimples, obtaining a direct measurement of the height changes or modifications caused by the damaging treatment can be complex and difficult. The image of the damaged golf ball will capture the height changes due to the damaging treatment, but the image will also capture height changes due to the curvature of the golf ball body as well as height changes due to the dimple pattern. One aspect of the present disclosure provides a solution for differentiating between the inherent golf ball geometric or profile features (i.e., curvature, dimples) and imperfections or damage that are intentionally inflicted on the golf ball in order to ascertain the durability of the golf ball, such as the cover of the golf ball. One solution involves applying a filter to the image or dataset of the damaged golf ball. The filter can be implemented or applied via a computer software solution or preprocessing module, for example. Exemplary filter techniques can include operator or function "highpass_image" which can be executed using the MVtec HALCON® from MVtec Software GmbH, as disclosed at: https://www.mvtec.com/doc/halcon/11/en/highpass_image.html; and/or the "highpass" function, which can be executed using MATLAB® Image Processing Toolbox from MathWorks®, as disclosed at: https://www.mathworks.com/help/signal/ref/highpass.html. In one aspect, a size of the matrix used in the filter can be adjusted. For example, a smaller matrix can show finer details. A larger matrix can join several smaller areas in proximity into one contiguous area, which can also be advantageous for determining the size of a damaged area. This process therefore involves obtaining a single image of the golf ball (which can include data, plots, etc.) and subsequently applying various machine vision, filtering techniques, or other computer aided analysis features to the single image.

Another solution involves obtaining two different images of the golf ball: one image prior to damaging the golf ball, and one image after damaging the golf ball. Exemplary difference image techniques can include operator or function "check_difference" which can be executed using the MVtec HALCON® from MVtec Software GmbH, as disclosed at: https://www.mvtec.com/doc/halcon/13/en/check_difference.html; and/or the "imabsdiff" function, which can be executed using MATLAB® Image Processing Toolbox from MathWorks®, as disclosed at: https://www.mathworks.com/help/images/ref/imabsdiff.html. One of ordinary skill in the art would understand that various image difference analysis functions or operators can be used.

Another solution can include a combination of the two solutions. One of ordinary skill in the art would understand that various aspects of features from each solution could be used in the other solution. Specific features of various embodiments involving these solutions are provided herein.

In one method of determining durability of a golf ball having an outer surface with a plurality of dimples, the method comprises applying a damaging treatment to the golf ball sufficient to mar the outer surface of the golf ball. Referring to FIG. 1, this step 10A shows a golf ball 15 with no damage (i.e., a new golf ball) undergoing a damaging treatment in which the golf ball 15' then has some marring. This damaging treatment could include repetitive striking of the golf ball, launching the golf ball at a surface including a groove or protrusion, or any other type of action that intentionally inflicts some mutilation on the golf ball.

Referring to FIG. 1, the method comprises scanning the outer surface of the golf ball (i.e., the damaged golf ball 15') via an imager 20 to acquire at least one first initial image of the golf ball 15'. This process is illustrated as step 10B in FIG. 1. The imager 20 can comprise a wide area three-dimensional measurement system, and/or a two-dimensional or three-dimensional profiler system. Exemplary equipment for performing this step can include a three-dimensional optical scanner or imager, that is configured to obtain an image of the golf ball's surface and accurately capture height variations along the golf ball's surface. The imager 20 can have a resolution of at least 0.001 inches per pixel and 0.001 inches per unit change in brightness, for example. The imager 20 can be a three-dimensional imager. The imager 20 can be configured to generate high resolution images, datasets, height plots, files, and/or other elements associated with scanning the golf ball 15'.

As shown in FIG. 1, a holder 25 can be configured to position the golf ball 15' relative to the imager 20. One of ordinary skill in the art would understand that the holder 25 can be stationary configured to hold the golf ball 15' in one position, or can be dynamic or adjustable such that the golf ball 15' can be rotated or otherwise move while being supported within the holder 25. An X-Y adjustment stage can be provided to rotate the golf ball. An X-Y-Z adjustment assembly can alternatively be provided to move the golf ball. One of ordinary skill in the art would understand that various positioning configurations can be providing in which the imager 20 is mobile or stationary, and/or the holder 25 is mobile or stationary. Positioning devices can have multiple degrees of freedom such that images can be captured of the golf ball from any angle, distance, orientation, etc.

As shown in FIG. 1, step 10C can include receiving data or information from the imager 20, such as the image and/or plot of the golf ball 15' or any associated dataset or file regarding the golf ball 15' and its surface images. As shown in FIG. 1, an analysis assembly can be provided that includes a computing system 30.

The computing system 30 can include one or more of a computer, central processing unit (CPU), electronics, circuitry, processor, memory unit, interface elements, and/or other electronics. For example, the computing system 30 can include any electronic components or features, including data and/or memory storage units, semiconductors, circuitry, etc. Data can be stored, transmitted, or otherwise used via the computing system 30 through any type of computer readable storage and transmission medium. The computing system 30 can include user interface components, such as a keyboard, mouse, touch pad or screen, etc. The computing system 30 can be configured to store data or information on hard drives or disks, random access memory (RAM), read only memory (ROM), portable hard drives, memory storing devices, USB drives, etc. A network interface can be provided such that the computing system 30 can communicate with external computing devices or other electronic devices. The computing system 30 can be configured to execute software, programming languages, source codes, object codes, or other instructions. Controllers, processing units, and other electronic components can be integrated with the computing system 30.

In an exemplary embodiment, the computing system 30 can be configured to run or implement a preprocessing module. In one aspect, the preprocessing module can be implemented in hardware and/or software. For example, the preprocessing module may include a software component stored in a memory unit on the computing system 30 and configured to perform preprocessing steps.

The preprocessing module may include a machine vision component or can be configured to run a machine vision software feature or module. Exemplary machine vision software modules (also referred to herein as machine vision software, machine vision components, or simply machine vision) can include MVtec HALCON® from MVtec Software GmbH, VisionPro® from Cognex®, Matrox® Imaging Library (MIL) from Matrox® Imaging, MATLAB® Image Processing Toolbox from MathWorks®, etc.

The computing system 30 can be configured to run or execute commands via the preprocessing module such that data or information from the imager 20 can be processed and analyzed. For example, the computing system 30 can include a processer and a memory unit associated with the preprocessing module and/or machine vision component. The processer can be configured to execute instructions stored by the memory unit in order to complete one or more steps of a durability testing process. The processor may use data received from the imager 20 as input in executing the stored instructions in order to complete at least one step in the durability testing process.

The computing system 30 can be configured to generate reports 35, such as test reports including a durability score or rating, charts, graphs, three-dimensional mappings, datasets, or other information. The computing system 30 can be configured to communicate with a network 40, such as a cloud-based network or data system. The computing system 30 can be connected to a display 45. The display 45 can be configured to display data, information, images, or any other materials associated with the imager 20. In one aspect, the display 45 is configured to display images, such as the images or plots shown in FIGS. 3A, 3B, 4A-4E, 5, 6A-6E, 7A, 7B, 8A, and 8B. Various other computer components, both software and hardware, can be used in conjunction with the components shown in FIG. 1.

Figure 3A:
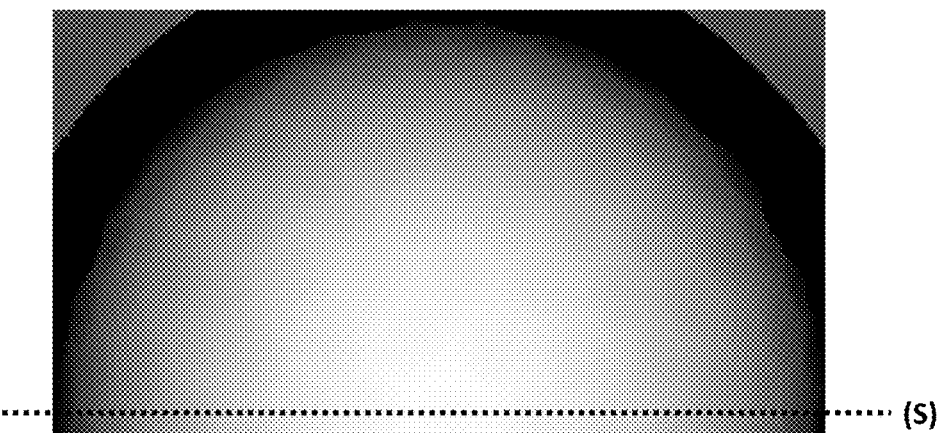
FIG. 3A is an image of a golf ball according to one aspect.

The imager 20 can be configured to obtain or capture an image, such as shown in FIG. 3A, which shows one example of a three-dimensional monochrome height image of the golf ball 15'. One of ordinary skill in the art would understand that fully colored height images of the golf ball can be generated by the imager 20. The images of the golf ball can be three-dimensional and the imager 20 can use associated software or electronic equipment to allow a user to view the golf ball model or images at various angles.

Figure 4A:
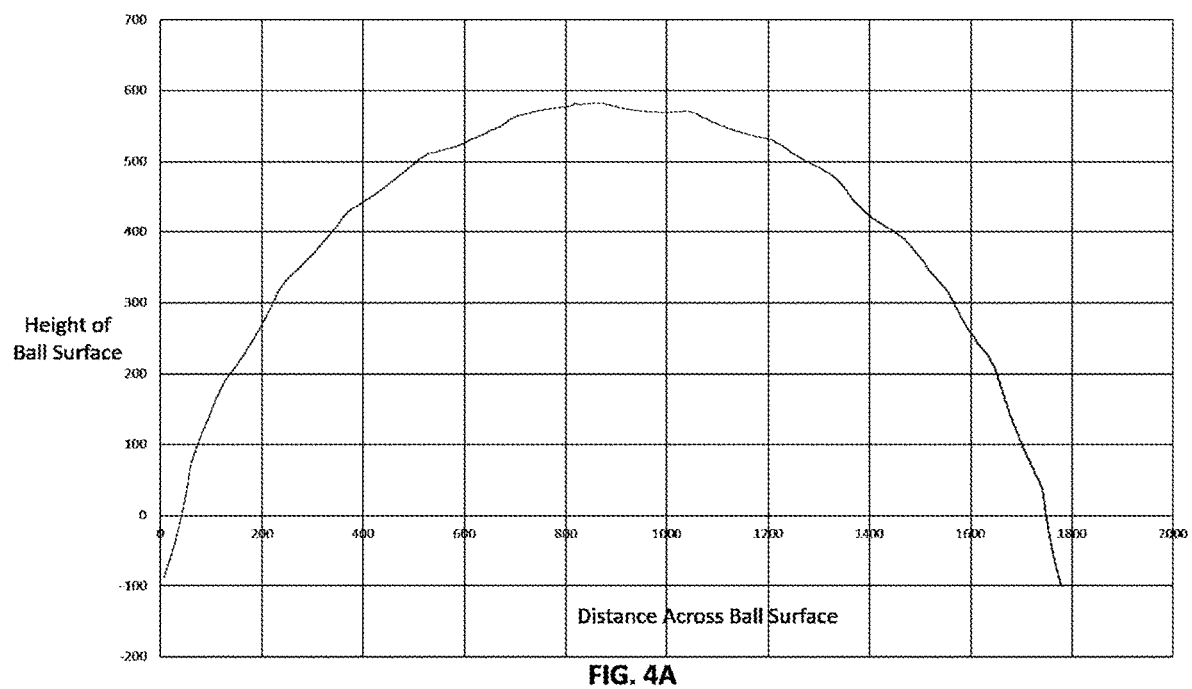
FIG. 4A is a plot illustrating a height of a portion of the golf ball surface from FIG. 3A.

A plot or graph that corresponds to a specific portion of the photographic image of the golf ball surface is shown in FIG. 4A, in which the vertical axis represents the height of the golf ball surface and the horizontal axis represents the distance across the golf ball. The plot shown in FIG. 4A illustrates one cross-section (i.e., slice or line) of the golf ball image shown in FIG. 3A. Only one cross-section is shown in FIG. 4A for illustrative and exemplary purposes, and one of ordinary skill in the art would appreciate based on the present disclosure that a plurality of cross-sections/plots can obtained, generated, analyzed, etc. An annotation to show an exemplary section or slice of the golf ball image in FIG. 3A is shown via "(S)" and can correspond to the specific plot shown in FIG. 4A. One of ordinary skill in the art would understand that the exemplary section or slice can be taken in any direction along the golf ball surface of image, and multiple sections or slices can be obtained from the golf ball image. In one example, a plurality of sections or slices, such as at least 10, 20, 50, 100, 500, 1,000, or 1,680 sections or slices can be obtained for the golf ball. In one aspect, the durability rating can be based on an average score aggregated from the plurality of sections or slices that have been analyzed. In one example, a section or slice can correspond to a 0.001 inch section or slice of the golf ball surface. In one example, the golf ball can be repositioned, and multiple images can be obtained for the golf ball. Accordingly, multiple slices or sections from each orientation or view of the golf ball can be analyzed to generate a single durability rating. One ordinary skill in the art would understand that more or fewer quantities of sections or slices can be obtained and analyzed according to the present disclosure. The plot shown in FIG. 4A can be generated via the data or information provided by the imager 20, for example, after processing via the computing system 30. The plot shown in FIG. 4A can be generated based on a data file, such as a CSV file, provided or generated via the imager 20.

Figure 4B:
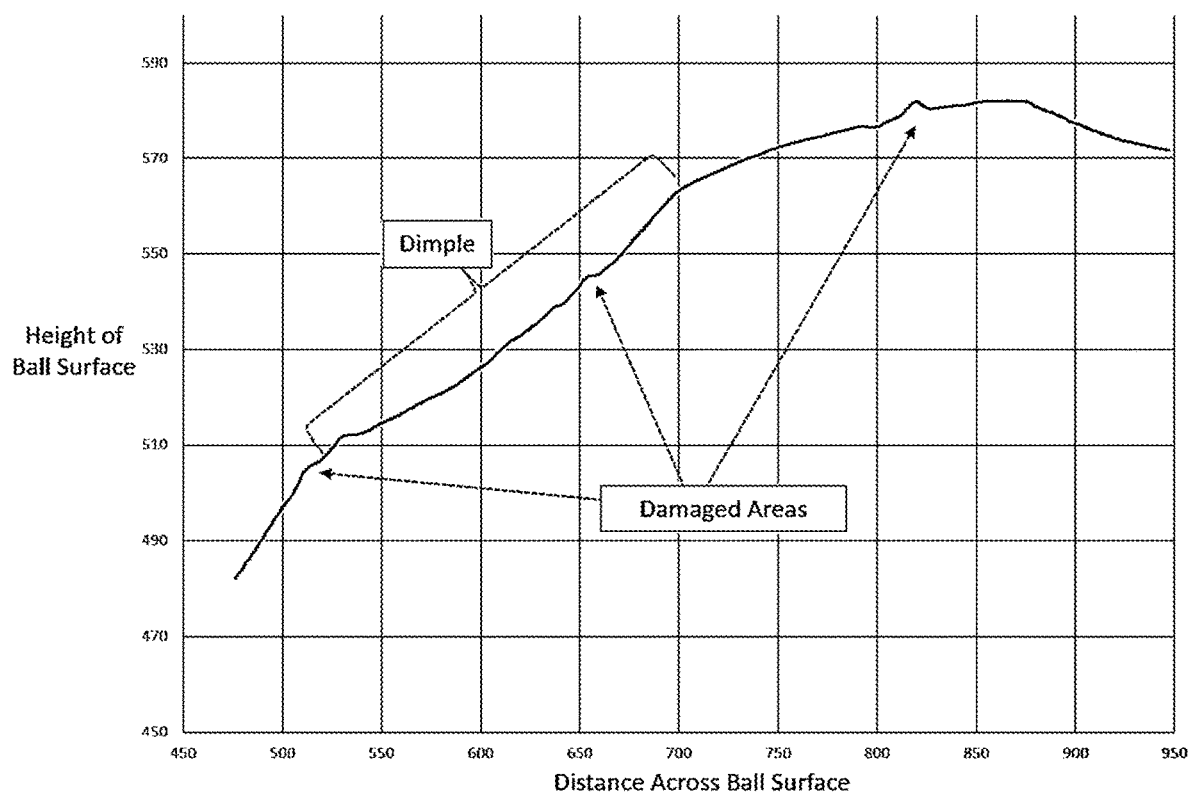
FIG. 4B is a magnified portion of the plot from FIG. 4A.
Figure 4C:
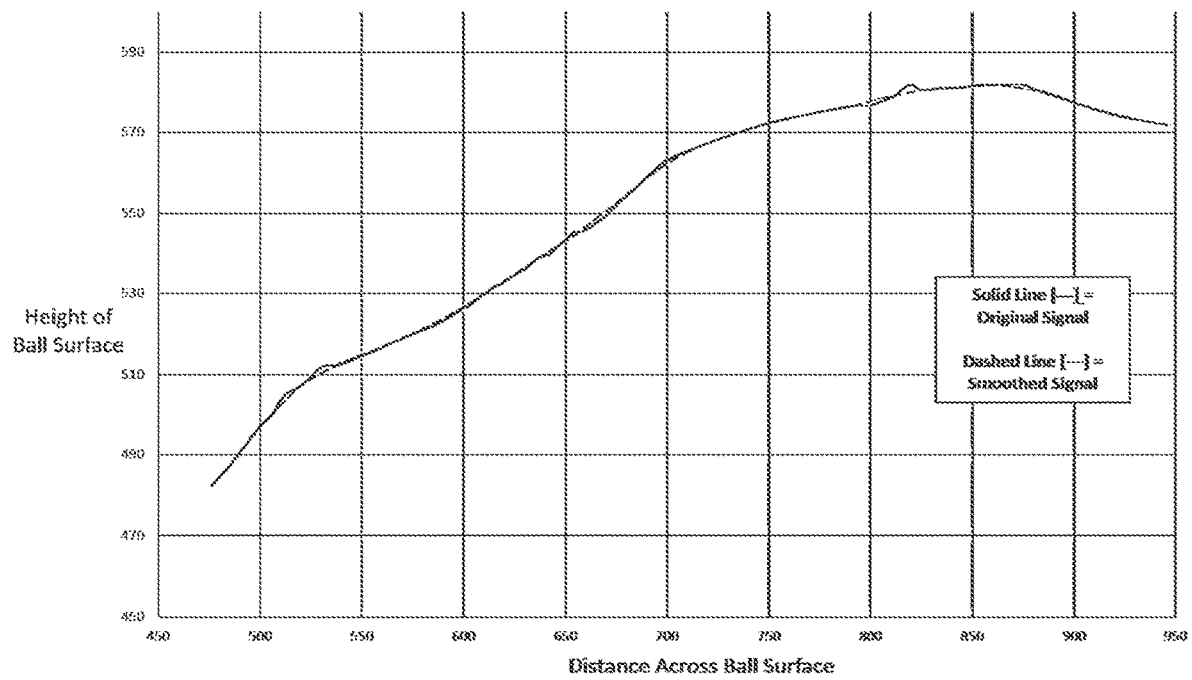
FIG. 4C is a plot illustrating a first signal associated with a height of a damaged golf ball surface and a second, smoothed signal associated with the height of the damaged golf ball surface.
Figure 4D:
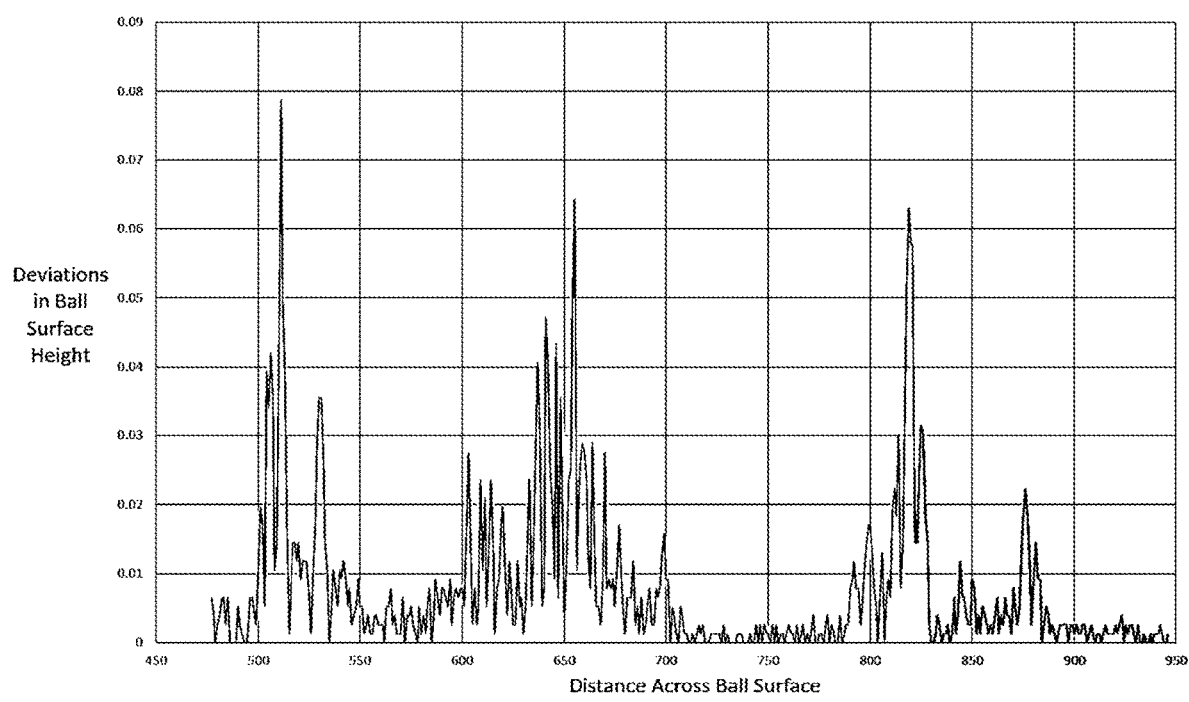
FIG. 4D is a plot of a high-pass filtered signal generated from the difference between the first signal and the second, smoothed signal in FIG. 4C.
Figure 4E:
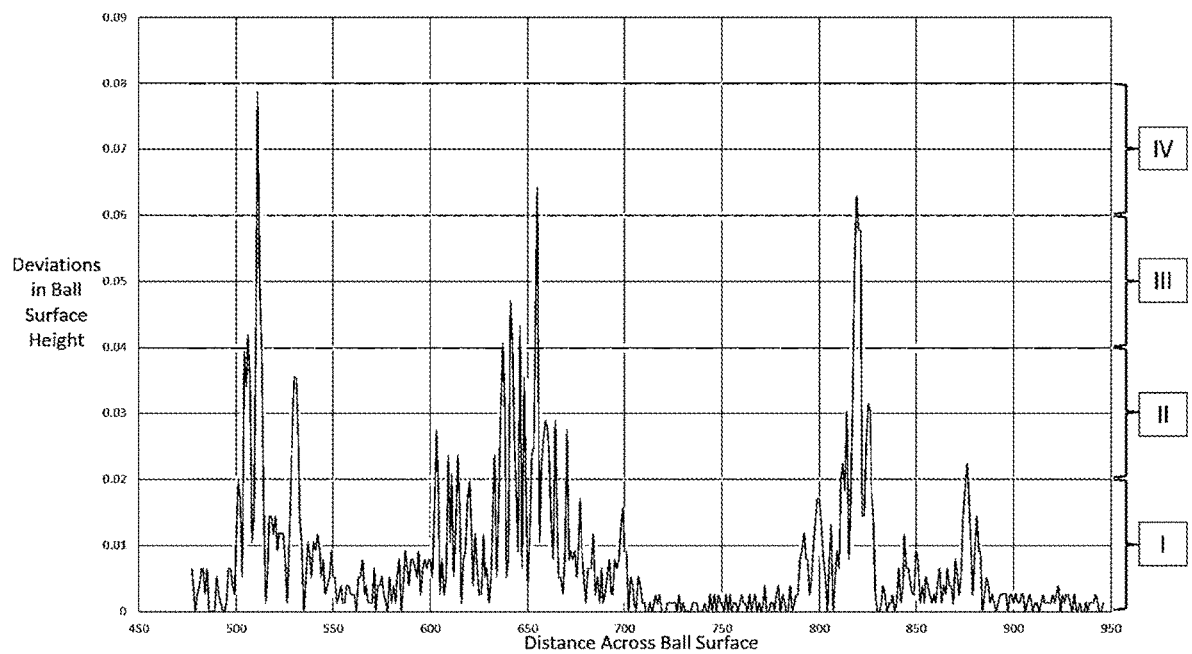
FIG. 4E is the plot of FIG. 4D with threshold settings applied to the high-pass filtered signal of the height of the damaged golf ball surface.
Figure 5:
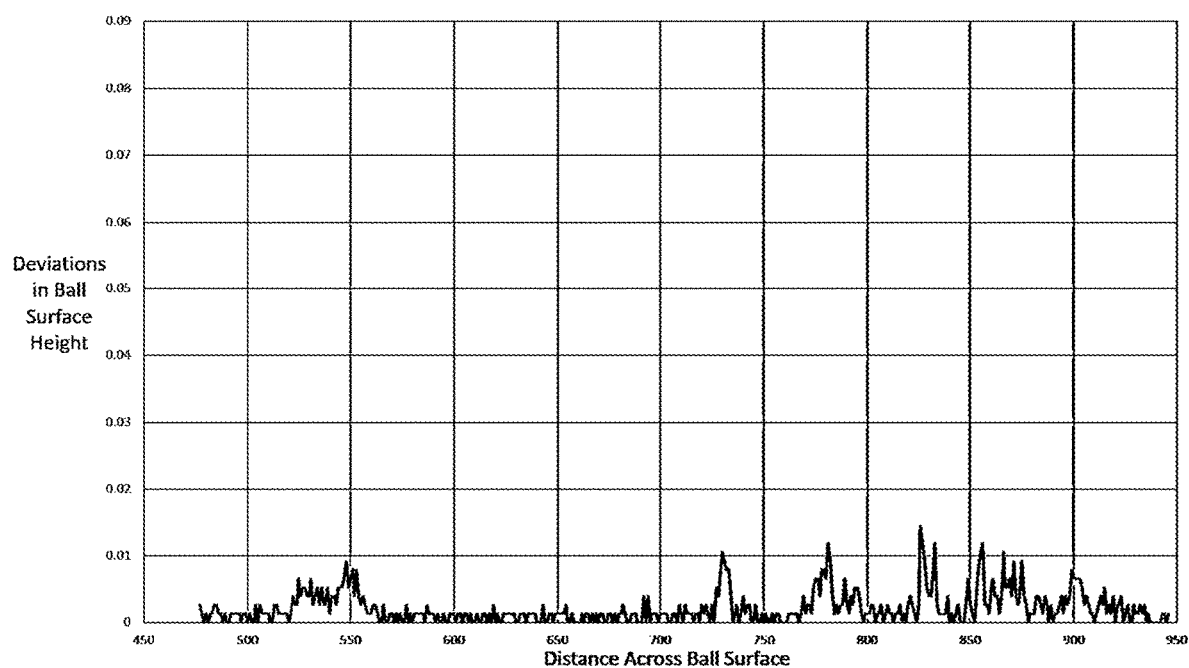
FIG. 5 is a plot illustrating a filtered signal of height deviations of a portion of a golf ball surface that has not undergone a damaging treatment.

In FIGS. 4A-4C, the vertical axis represents a height of the ball surface, which can be filtered and modified according to various techniques disclosed herein, and the horizontal axis represents distance across the golf ball surface. In FIGS. 4A-4C, the units of the x-axis and y-axis are scaled such that 1 unit on the x-axis and y-axis corresponds to 0.001 inches, 10 units on the x-axis and y-axis corresponds to 0.010 inches, 100 units on the x-axis and y-axis corresponds to 0.10 inches, 1,000 units on the x-axis and y-axis corresponds to 1.00 inches, etc. The x-axis in the other plots shown in FIGS. 4D, 4E, 5, 7B, and 8B use the same scale as FIGS. 4A-4C. In FIGS. 4D, 4E, and 5, the y-axis is in inches with no scaling. One of ordinary skill in the art would understand that the scaling, dimensions, or other parameters of the plots can vary.

The plots disclosed herein show a single cross-sectional slice across the golf ball. One of ordinary skill in the art would understand that individual cross-sectional slices of the golf ball can be analyzed, and/or multiple cross-sectional slices of the golf ball can be used to analyze the surface of the golf ball. For any given golf ball, multiple iterations of analysis, such as difference image techniques, high-pass filter techniques, and/or other features disclosed herein can be performed in order to provide an overall durability rating for the golf ball. In one aspect, machine vision techniques and/or other features of the computing system can be configured to analyze multiple cross-sections, portions, slices, or other portions of the golf ball based on a single image obtained of the golf ball surface. In one aspect, the present disclosure is configured to aggregate, compile, or otherwise gather various plots, data, or other information associated with any image or set of images, and prepare a compilation of said plots, data, or other information to generate a single durability rating or score. The aggregating, compiling, generating, and other steps can be performed via any one or more of the imagers, computing system, processors, modules, machine vision features, or other components disclosed herein.

In FIGS. 4A-4C, the severity of damage to the golf ball surface can be determined or measured by a rate of change of the plot. For example, the damaged areas indicated in FIG. 4B can be seen to have a rate of change that is more rapid than the rate of change associated with the dimple. FIG. 4B illustrates a magnified view of the regions 450 to 950 of a portion of the image of FIG. 3A and the plot of FIG. 4A. Regions 450 to 950 can correspond to X-coordinates along the golf ball surface. As shown in FIG. 4B, damage to the golf ball surface is apparent (i.e., the rate of change of the plot is greater) in the areas indicated by annotations in this Figure. A dimple is also apparent in FIG. 4B as shown by the annotation. The computing system 30 and/or the preprocessing module can be configured to execute magnifying techniques or various visualization functions to provide greater detail regarding specific regions on the golf ball surface. The surface of an undamaged golf ball will have inherent surface height deviations, but these changes in height are visibly different from sudden damaged areas, which randomly manifest on the golf ball surface after the damaging treatment, and these two types of surface deviations can be differentiated using a machine vision and/or filtering technique as described herein.

In one example, a moving average function can be used, which is shown via the plot in FIG. 4C. As shown in FIG. 4C, the original or raw signal associated with the height profile of a golf ball that has undergone damaging treatment is illustrated by a solid line (i.e., the signal shown in FIG. 4B), and the smoothed signal associated with the height profile of the same golf ball that has undergone damaging treatment is illustrated by a dashed line. A smoothing tool can be used to generate the smoothed signal. In one aspect, the smoothing tool can include adjustable parameters, such as a size of the moving average. Various thresholds of a smoothing tool can also be adjusted. One of ordinary skill in the art would understand that fewer or more sample moving average functions can be used. The moving average in FIG. 4C can include more than three samples. Implementing a moving average function or tool can adjust the types of features that the filter is sensitive to by smoothing parts of the plot where the rate of change is slower than those smoothed by a three-sample moving average. In one aspect, the smoothing tool or function is configured to mute, lessen, or attenuate the signals associated with the curvature of the golf ball and its dimple pattern (i.e., slower rates of height change in the golf ball surface), while emphasizing or passing through the signals associated with marring or damage to the golf ball (i.e., faster rates of height change in the golf ball surface).

These smoothing functions can be executed or implemented via the computing system 30, i.e., through machine vision software and/or preprocessing module. A moving average technique can be used to ensure accurate results and analysis of the data or information from the imager 20. Adjusting the size of the moving average can change the types of features that the filter is sensitive to and therefore attenuates. Exemplary smoothing techniques can include, for example, "mean_image" via MVtec HALCON® from MVtec Software GmbH, as disclosed at: https://www.mvtec.com/doc/halcon/13/en/mean_image.html; and/or "mean2" via MATLAB® Image Processing Toolbox from MathWorks®, as disclosed at: https://www.mathworks.com/help/images/ref/mean2.html. One of ordinary skill in the art would understand based on the present disclosure that various smoothing, means, averaging, etc., techniques can be used.

Data or information associated with the original or raw signal of the golf ball surface height and the smoothed signal of the golf ball surface height can then be used to further emphasize or distinguish between inherent golf ball geometry/features and any disfigurement of the golf ball surface. For example, the preprocessing module or computer can be configured to generate a difference plot, image, or other data file regarding differences between the original signal and the smoothed signal. FIG. 4D is a plot showing the difference between the two lines shown in FIG. 4C, i.e., the difference between the original signal (raw signal) and the smoothed signal. This is one exemplary technique for producing a high-pass filter. One of ordinary skill in the art would understand that this type of high-pass filter is generated based on passing through the high frequency changes (i.e., marring) and muting or filtering out the low frequency changes (i.e., golf ball inherent features). Because this plot represents an absolute difference, all the points in the plot showing deviations in the golf ball surface height are greater than zero. As can be observed in FIG. 4C, the original signal is at times above and at times below the smoothed signal. One of ordinary skill in the art would understand that if the absolute value were not used, then the plot would be both positive and negative indicating whether damage was above or below the surface of the ball.

FIG. 4D illustrates a filtered plot or graph showing the height change of a golf ball that underwent a damaging treatment. In FIG. 4D, a filtering technique was applied to the original signal, and the filtering technique is configured to use the difference between a smoothed signal or image and an original signal associated with the height or brightness of a golf ball surface. The plot of FIG. 4D represents a signal that underwent the same processing as described above with respect to a three-sample moving average. These results can be compared with the results in FIG. 5, which shows the same type of plot or graph of a golf ball surface for an undamaged ball as opposed to a damaged ball. As shown by this filtered signal of an undamaged ball, the entire signal for the height or brightness deviation is below 0.02 inches.

The method can comprise applying a high-pass filter (i.e., a filter process, function, etc.) to the at least one first initial image that was captured by the imager 20 to generate at least one first filtered image or dataset. The high-pass filter can be incorporated into the computing system 30 and/or preprocessing module, and can be executed using computer programming, software, or other data manipulation components. The high-pass filter can be a filter module or function that is integrated with the computing system 30 and/or preprocessing module. One of ordinary skill in the art would understand that the high-pass filter can be a software module or solution that is installed or running on the computing system 30, or running virtually or remotely.

High-pass filters are generally understood by those of ordinary skill in the art as being an electronic function, module, filter, component, or other element that is configured to pass through signals with a frequency higher than a certain threshold or cutoff frequency, and attenuate signals with frequencies lower than the threshold or cutoff frequency. In some aspects, the high-pass filter can be realized using a spatial domain and/or a frequency domain. One of ordinary skill in the art would understand that various sampling techniques can be used to generate a filtered signal or image.

A user interface can be provided on the computing system 30 such that the filter function or module, among other image processing functionalities and processes, can be set and/or adjusted. In one example, the user interface can be provided via a machine vision software component or preprocessing module. Settings of a high-pass filter, such as the sensitivity or sample size for generating a smoothed signal of the golf ball height, can be adjusted such that the plurality of dimples are attenuated, while marring from the damaging treatment remains visible in the at least one first filtered image or dataset.

The settings of the image processing features can vary as one of ordinary skill in the art would appreciate based on this disclosure. In one general example, the image processing features can be configured to differentiate between slowly changing, low frequency features (i.e., curvature of golf ball surface, dimples), and any closely spaced, high frequency features (which indicate damage). The image processing features can be set or calibrated to differentiate between these two general types of areas based on using a high-pass filter setting, in one example.

Figure 3B:
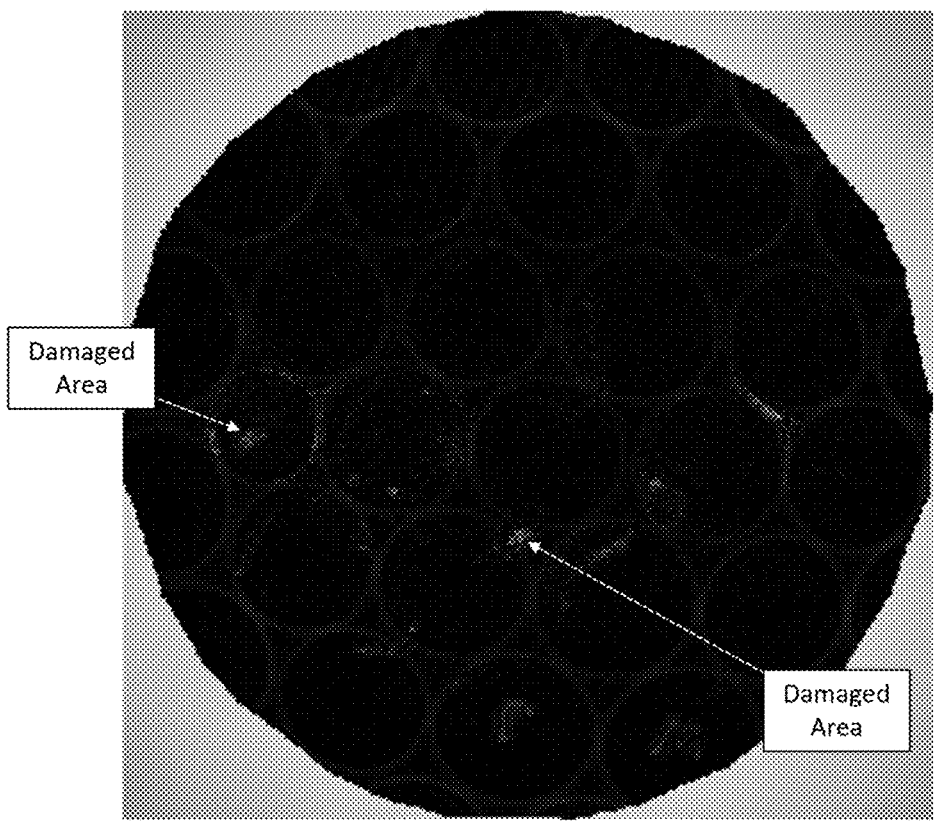
FIG. 3B is a filtered image of a golf ball according to one aspect.

FIG. 3B illustrates a filtered image of the golf ball surface. In a more specific aspect, the image of FIG. 3B is similar to FIG. 3A but a high-pass filter function has been applied to the image or dataset. Stated differently, the image in FIG. 3B is representative of a golf ball surface that has undergone a technique as described above with respect to FIGS. 4C and 4D. The functions (i.e., filtering, moving averages, sampling, etc.) can be implemented or executed via the computing system 30 and/or a preprocessing module. FIG. 3B illustrates the scanned image of the golf ball surface with a high-pass filter or function applied, such that surface features associated with ordinary golf ball surface geometry, i.e., dimples, curvature, are muted or filtered out and the surface features indicative of damage remain. Additional image processing functions could be applied to this image or any other images of the golf ball. As shown in FIG. 3B, damaged areas are apparent or visible via the gray areas or white areas on the otherwise black image of the golf ball surface. Lighter, non-black areas correspond to areas of the surface that differ more from the smoothed image, as the higher peaks in FIG. 4D. Dimple outlines are also visible in this image, but less prominent than the damaged areas.

Various processing or filtering techniques can be configured to use the difference between the smoothed signal/image and the original signal/image. Obtaining or calculating this difference in the signals or images results in a dataset that is specifically configured to only show the high frequency features (i.e., high frequency surface features). The filter can be configured to attenuate slow, more gradual changes in height that occur over longer distances and pass through faster, more rapid changes in height that occur over shorter distances. The filter can be configured to generally indicate or convey a rate of change in the height of the golf ball surface. In one aspect, the severity of the damage or marring to the golf ball surface can be proportional to or related to the rate of change, slope, and/or length of signal that is output by the high-pass filter.

In one aspect, the high-pass filter is configured to attenuate a first subset of frequencies in the at least one first initial image such that a second subset of frequencies from the at least one first initial image remain in the at least one first filtered image. The first subset of frequencies can be lower frequencies, such as the height changes or signal changes associated with the curvature of the golf ball surface or the dimples on the golf ball surface. The second subset of frequencies can be higher frequencies, such as sudden, sharp, and/or large spikes or drops in the height of the golf ball surface, which are associated with marring, scuffs, roughening, cuts, and/or other imperfections that are inflicted on the golf ball surface via the damaging treatment.

In one example, first regions of the golf ball surface having a first characteristic (i.e., relatively high rates of change or frequencies) that are above the at least one first threshold setting are assigned a first identifying characteristic. For example, the first identifying characteristic can correspond to damaged regions of the golf ball surface. The computing system 30 (e.g., via a preprocessing module, machine vision module, etc.) can be configured to identify these regions (such as via a label or annotation) such that these regions are clearly identified to the user as damaged regions of the golf ball surface, and generate or return quantified information or metrics about these regions such as the total area of the region, the area of the largest single region, the number of discrete areas, or any other measurable parameter that may be helpful in assessing the level of damage to the ball surface.

Second regions of the golf ball surface having a second characteristic (i.e., relatively low rates of change or frequencies) that is below the at least one first threshold setting are assigned a second identifying characteristic. For example, the second identifying characteristic can correspond to undamaged regions of the golf ball surface. The computing system 30 can be configured to identify these regions (such as via a label or annotation) such that these regions are clearly identified to the user as undamaged portions or regions of the golf ball surface, and likewise generate or return quantified information about the region. The first identifying characteristic and the second identifying characteristic can be associated with different heights or different brightness values detected along the outer surface of the golf ball.

FIG. 4E illustrates one example of the high-pass filtered signal with a plurality of threshold settings or limits applied at various levels, including 0.02, 0.04, 0.06, and 0.08. The units for the values of 0.02, 0.04, 0.06, 0.08, etc. are in inches. FIG. 4E illustrates the same plot as FIG. 4D but with additional thresholds applied to the plot. While four limits are shown in FIG. 4E, one of ordinary skill in the art would understand based on this disclosure that more than four limits or fewer than four limits could be applied to the filtered signal. Various styles of a dashed line are used for the various levels in FIG. 4E, but one of ordinary skill in the art would understand that the various levels or thresholds could be shown via different colors or other indicators. In one aspect, a plurality of threshold settings can be applied to the filtered image or dataset, and each of the thresholding settings can have a different threshold such that varying degrees of marring can be filtered based on the plurality of threshold settings.

Referring to FIG. 4E, areas corresponding to a first level of damage (i.e., lowest damage, "I" in FIG. 4E) are associated with areas of the signal that are below 0.02 inches. Areas corresponding to a second level of damage (i.e., relatively low damage, "II" in FIG. 4E) are associated with areas of the signal that are below 0.04 inches but above 0.02 inches. Areas corresponding to a third level of damage (i.e., relatively high damage, "III" in FIG. 4E) are associated with areas of the signal that are below 0.06 inches but above 0.04 inches. Areas corresponding to a fourth level of damage (i.e., highest damage, "IV" in FIG. 4E) are associated with areas of the signal that are below 0.08 inches but above 0.06 inches. Gradations or thresholds of damage above 0.08 inches are possible in other examples.

FIGS. 6A-6E illustrate various images of a damaged golf ball using different thresholds. Each of the images show a particular damage condition within certain predefined threshold settings. In each of the images, damage or marring to the golf ball surface is indicated by spots or specks of white on the otherwise black image of the golf ball.

Figure 6A:
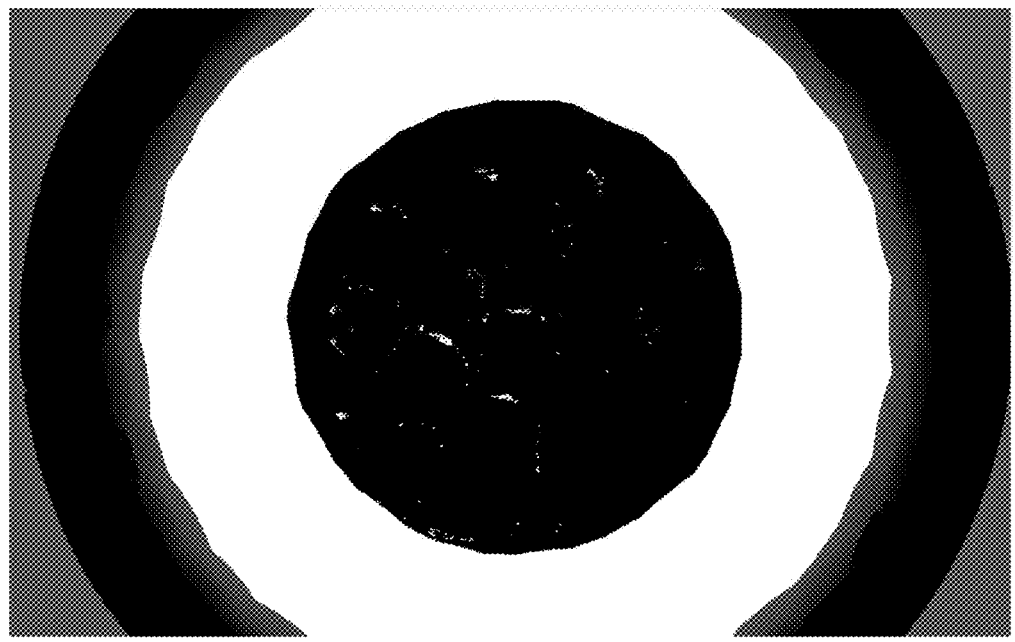
FIG. 6A is a filtered image of a golf ball surface according to a first threshold filter setting.

As shown in FIG. 6A, a lowest threshold is applied to the filtered image of the golf ball. Using this lowest threshold setting, a significant portion of the golf ball surface has indications of marring or damage. This is visually shown via the white spots or specks that are shown in the otherwise black area of the golf ball. The threshold applied in FIG. 6A can be 0.02 inches or groups "II, III, & IV" from FIG. 4E. The damage shown in FIG. 6A can correspond to minor scrapes, scratches, indentations, etc.

Figure 6B:
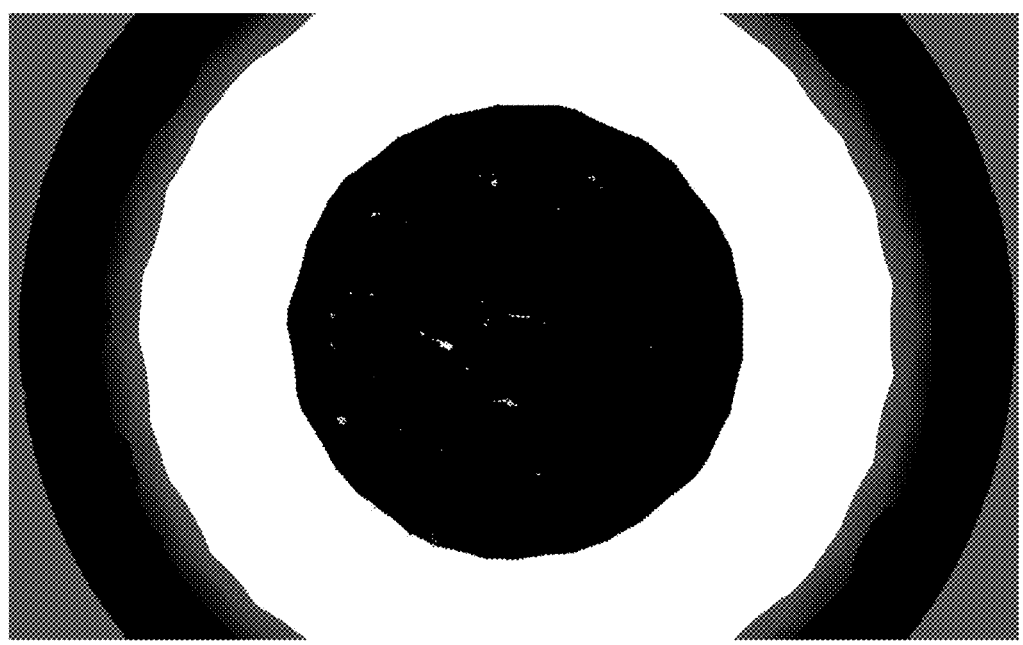
FIG. 6B is a filtered image of a golf ball surface according to a second threshold filter setting.

FIG. 6B shows the image of the golf ball with a threshold setting that is greater than the threshold applied in FIG. 6A. As compared to FIG. 6A, the image in FIG. 6B shows a lesser degree of marring to the golf ball surface. The threshold applied in FIG. 6B can be 0.04 inches or group "III & IV" from FIG. 4E. The damage shown in FIG. 6B can correspond to relatively larger scrapes, scratches, indentations, etc.

Figure 6C:
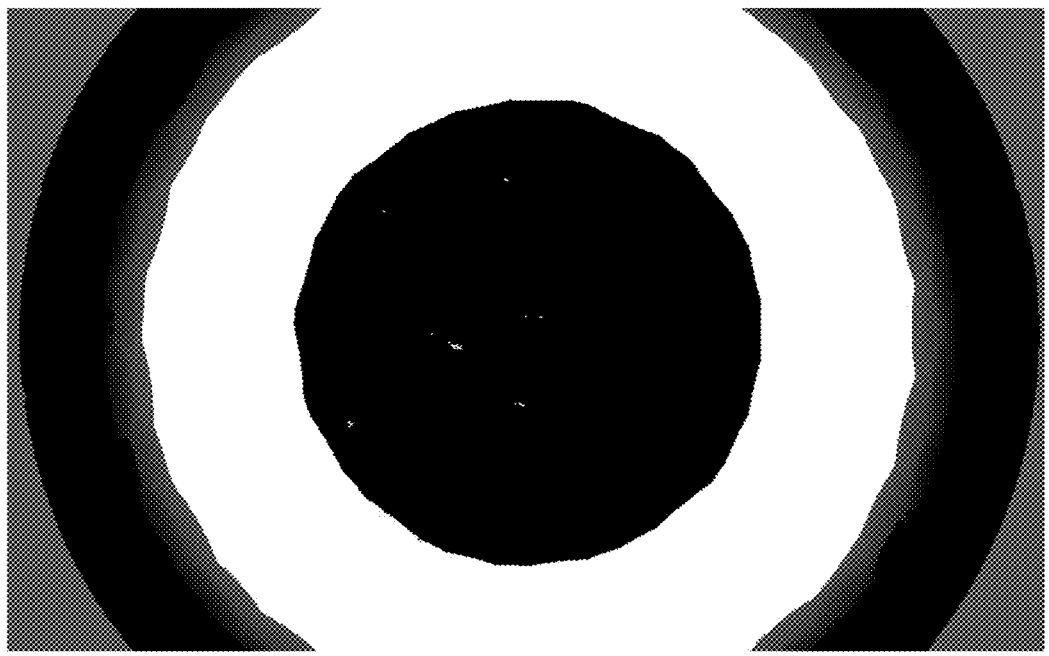
FIG. 6C is a filtered image of a golf ball surface according to a third threshold filter setting.

FIG. 6C shows the image of the golf ball with a threshold setting that is greater than the threshold applied in FIG. 6B. As compared to FIG. 6B, the image in FIG. 6C shows a lesser degree of marring to the golf ball surface. The threshold applied in FIG. 6C can be 0.06 inches or group "IV" from FIG. 4E. The damage shown in FIG. 6C can correspond to relatively severe, and visible marring, scratches, and wear to the golf ball.

Figure 6D:
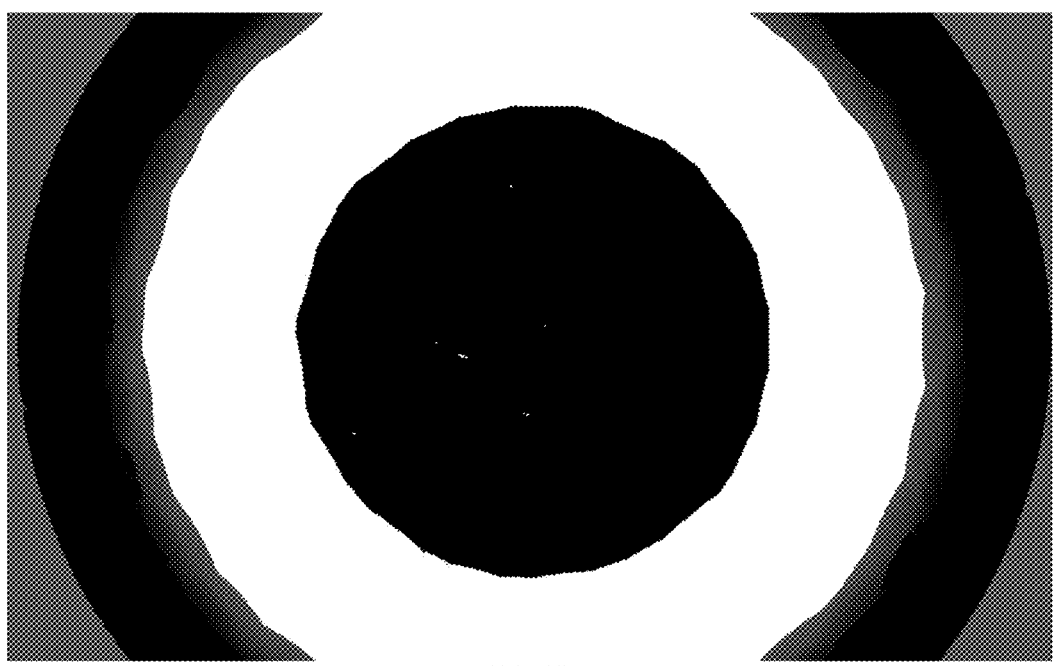
FIG. 6D is a filtered image of a golf ball surface according to a fourth threshold filter setting.

FIG. 6D shows the image of the golf ball with a threshold setting that is greater than the threshold applied in FIG. 6C. As compared to FIG. 6C, the image in FIG. 6D shows a lesser degree of marring to the golf ball surface. The threshold applied in FIG. 6D can be 0.08 inches. The damage shown in FIG. 6D can correspond to clearly visible, significant cuts or raised protrusions of the golf ball cover.

Figure 6E:
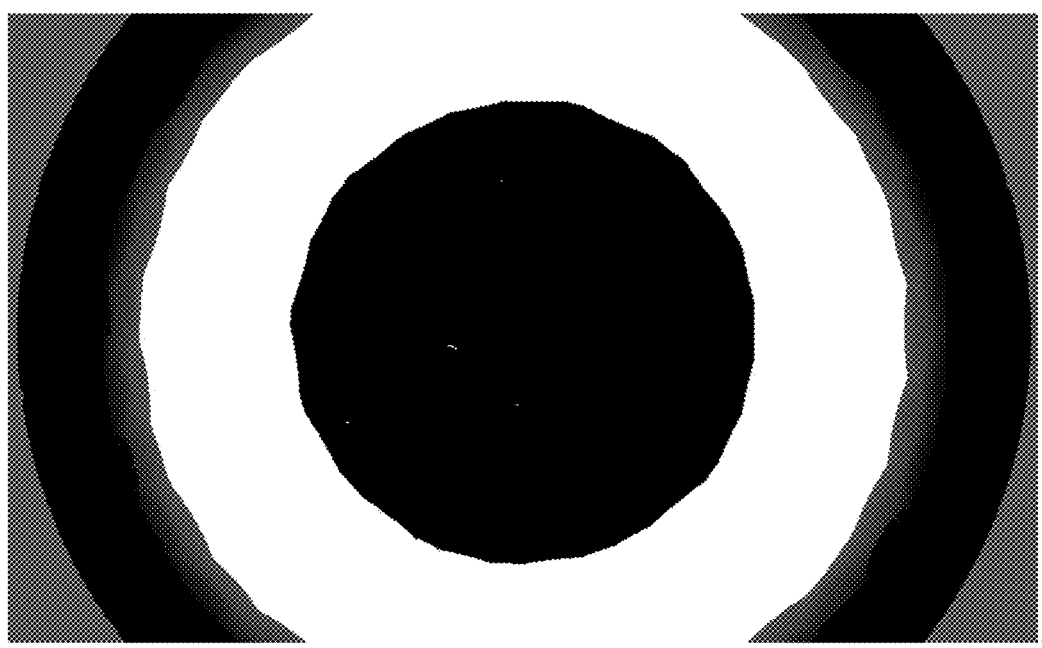
FIG. 6E is a filtered image of a golf ball surface according to a fifth threshold filter setting.

FIG. 6E shows the image of the golf ball with a threshold setting that is greater than the threshold applied in FIG. 6D. As compared to FIG. 6D, the image in FIG. 6E shows a lesser degree of marring to the golf ball surface. The threshold applied in FIG. 6E can be 0.10 inches. The damage in FIG. 6E can correspond to extremely severe cuts, tears, and rips in the golf ball cover.

Various grading schemes or formats can be used to convert or transform data from the filtered signal into a score, grade, or other report that a user can then use to determine the state, durability, or other characteristic of the golf ball. For example, various categories of damage are shown in FIG. 4E: category I, category II, category III, and category IV. The severity of damage increases as the Roman numeral reference increases. Using the exemplary grading system as applied to FIG. 4E, there are three distinct areas having category IV damage. There are roughly four peaks of the signal in FIG. 4E indicating roughly four distinct areas having category III damage. The remainder of the golf ball surface has a mixture of category I and category II damage.

An exemplary grading system according to one aspect can include letter grades, i.e., "A," "B," "C," "D," "F," etc. In one aspect, a golf ball surface having relatively minimal damage can be assigned an "A" grade. In contrast, a golf ball surface having significant damage can be assigned an "F" grade. Alternatively, the grading system can include numerical grades, in which a value of "1" corresponds to an undamaged golf ball, and a value of "99" corresponds to a severely damaged golf ball. Regardless of the exact grading system, the present disclosure provides an objective testing criteria in which golf balls having similar damage profiles, which can be quantifiably measured based on size of damaged areas, quantity of discrete damaged areas, and other parameters described herein, are assigned similar durability scores.

The method can further comprise determining the durability of the golf ball and/or the golf ball outer surface based on an extent of marring in the at least one first filtered image. The term "extent" can refer to a total amount of marring, a severity of marring, a quantity or frequency of marring, or any other metric. For example, marring occurring over 50% of the analyzed golf ball surface area can correspond to a relatively high damage grade. In another example, marring can only affect a relatively small area (i.e., less than 10% of the golf ball surface area) but the marring may be severe (i.e., full cuts, tears, penetration into the cover of the golf ball). This example could also correspond to a relatively high damage grade. In yet another example, multiple discrete areas of marring can manifest on the golf ball surface due to the damaging treatment. While none of the discrete areas of marring are severe, and the total area of marring is moderate (i.e., less than 50% of the golf ball surface area), this exemplary type of damage may also be assigned a relatively high damage grade. In one example, the present disclosure can include determining at least one of the following based on the at least one first filtered image and threshold: a total size of the damaged area on the golf ball, a quantity of discrete damaged areas on the golf ball, or a largest damaged area size on the golf ball. The present disclosure can measure or calculate these parameters based on a number of different criteria. For example, a predetermined size (i.e., pixel area or region) can be set to qualify as a "damaged area." The present disclosure can then be configured to count the number of "damaged areas." The total size or area of the damaged area can be calculated as any area that includes any degree of marring. The total size or area can be represented by pixel size or area.

In one example, the quantity of damaged areas can be used to determine durability rating. For example, if 0-3 damaged areas are present, then a high durability grade is assigned. If 4-7 damaged areas are present, then a moderate-high durability grade is assigned. If 8-11 damaged areas are present, then a moderate durability grade is assigned. If 12-15 damaged areas are present, then a moderate-low durability grade is assigned. If over 15 damaged areas are present, then a low durability grade is assigned.

In one example, the size of the total damaged areas can be used to determine durability rating. For example, if 0.0%-1.99% of the total scanned golf ball surface is damaged, then a high durability grade is assigned. If 2.00%-3.99% of the total scanned golf ball surface is damaged, then a moderate-high durability grade is assigned. If 4.00%-5.99% of the total scanned golf ball surface is damaged, then a moderate durability grade is assigned. If 6.00%-7.99% of the total scanned golf ball surface is damaged, then a moderate-low durability grade is assigned. If 8.00% or more of the total scanned golf ball surface is damaged, then a low durability grade is assigned.

In one example, a largest damaged area (i.e., a single largest damaged area) can be used to determine durability rating. For example, if the largest single damaged area is 150 pixels, then a low durability grade is assigned. If the largest single damaged area is 120 pixels, then a moderate-low durability grade is assigned. If the largest single damaged area is 90 pixels, then a moderate durability grade is assigned. If the largest single damaged area is 60 pixels, then a moderate-high durability grade is assigned. If the largest single damaged area is 30 pixels, then a high durability grade is assigned.

For comparative purposes only, the golf ball surface shown in FIG. 5, i.e., an undamaged golf ball, can be assigned a durability score of "A" or of "1," while the golf ball surface represented by the plot shown in FIGS. 4D and 4E can be assigned a score of "C" or "25." These values are provided simply for illustrative purposes and to show comparative values on exemplary durability testing systems. Regardless of the scoring system that is adopted, the present disclosure is configured to provide a durability score based on the damage that is detected via the techniques disclosed herein and a predetermined scoring criteria. Once the predetermined scoring criteria is implemented, then all golf balls that are analyzed according to the present disclosure can be configured to receive objective durability ratings or scores. One of ordinary skill in the art would understand that a predetermined scoring criteria can rely on various parameters.

In one example, each of the various criteria are used in conjunction with each other to generate a single score or grade. Some of the criteria can be weighted more or less than other criteria. In one example, each of the criteria is weighted equally.

Any one or more types of grading systems, which can employ sorting or categorizing algorithms, functions, or processes can be used to empirically assess the damage caused to the golf ball. Accordingly, an objective grading system is provided that reliably and accurately determines the durability of a golf ball. In one aspect, the method disclosed herein further comprises assigning a durability grade based on calculations or determinations associated with the at least one first filtered image and threshold. For example, the method can further comprise assigning a durability grade based on at least one of the total size of the damaged area on the golf ball, the quantity of discrete damaged areas on the golf ball, or the largest damaged area size on the golf ball.

In another aspect, the present disclosure can provide a configuration or solution for determining the durability of a golf ball or golf ball cover that is based on a difference image between a first image of the golf ball taken prior to applying a damaging treatment and a second image of the golf ball taken after applying the damaging treatment. The difference image is based on a comparison or difference between the first and second images of the golf ball. The golf ball is scanned or imaged in the same position for both of the first and second images, so that the damage inflicted via the damaging treatment is readily ascertainable.

The difference image feature can be executed via a software interface, such as a machine vision module or preprocessing module. The difference image can be configured to be executed via known image processing solutions, software, programs, etc., as mentioned herein, such as HALCON® or MATLAB®.

In one example, a method of determining durability of a golf ball having an outer surface with a plurality of dimples is provided. The method comprises obtaining at least one first image of the outer surface of the golf ball via an imager. The golf ball can be held relative to the imager in a first orientation. In one example, the markings, such as orientation markings, can be applied to the golf ball such that the exact position of the golf ball relative to a holder can be precisely determined and apparent.

The method further comprises applying a damaging treatment to the golf ball sufficient to mar the outer surface of the golf ball. The damaging treatment can include repeatedly applying a striking force to the golf ball, firing the golf ball into a surface, or any other known processes for damaging a golf ball.

The method further comprises obtaining at least one second image of the outer surface of the golf ball via the imager. The golf ball is configured to be supported in a holder in the exact same orientation (i.e., first orientation) as was used while obtaining the first image of the outer surface of the golf ball during this method. The golf ball can therefore be positioned in the identical configuration while obtaining the first and second images of the golf ball.

The method further comprises determining the durability of the golf ball based on at least one difference image generated based on a comparison between the at least one first image and the at least one second image. The difference image can be based on comparison of data files, such as CSV files, associated with the first and second images.

The method can further comprise determining at least one of the following based on the at least one difference image: a total size of the damaged area on the golf ball, a quantity of discrete damaged areas on the golf ball, or a largest damaged area size on the golf ball. The method can further comprise assigning a durability grade based on at least one of the total size of the damaged area on the golf ball, the quantity of discrete damaged areas on the golf ball, or the largest damaged area size on the golf ball.

In one aspect, the present disclosure provides a solution for detecting damage to a golf ball surface and/or determining the durability of the golf ball. The surface of the golf ball can be scanned, such as via a wide area 3-D measurement system or any other 3-D scanning system with sufficient resolution and range. This scan can be performed prior to damaging the golf ball, after damaging the golf ball, or at any other time. The image or scan of the golf ball can then be analyzed to measure the degree and area of damage. The image can be preprocessed if needed to facilitate analysis.

Damage to the golf ball, such as cover damage, can vary from a slightly rough area on the frets to a cut or tear that goes deep into the cover. Regardless of the type of damage, the scuffing or marring always results in raised or depressed areas on the cover. In one aspect, to facilitate detection and rating the severity of damage to the golf ball, a filter, such as a high-pass filter, is applied to the image obtained by the scanning system or device. The filter is configured to attenuate slow changes in height that happen over longer distances, i.e., the radius of the golf ball or the curvature of the dimples, and passes faster changes in height that happen over shorter distances, i.e., scratches in the cover, paint defects, tooling markings or codes, etc. One of ordinary skill in the art would understand that the filter can be applied via machine vision techniques.

The filter can be configured to emphasize or identify the rate of change of height in the golf ball surface or cover. The severity of damage can be determined, inferred, extrapolated, or otherwise calculated by characteristics of the filtered signal or image, such as rate of change, slope, length of slope, etc. The result of applying a high-pass filter to the scanned image of a damaged ball is that the image obtained via the scanning system can be converted into a uniform shade or color, such as gray. In the filtered image, the dimple edges (i.e., relatively higher elevations or heights) may be slightly brighter as compared to surrounding areas (i.e., the troughs or depressions of the dimples). Faster changes in height, which indicates damage to the golf ball surface, appear closer to white in the filtered image.

Additional granularity regarding the filtered or high-pass signals of the golf ball surface can be realized via application of threshold settings. Applying a threshold to the filtered or high-pass image, can be configured to select, emphasize, highlight, or otherwise indicate areas of the golf ball surface that are above a certain brightness. This threshold therefore can be used to isolate the damaged areas. In one example, the damaged area can be measured in pixels. Different degrees of damage (i.e., low severity to high severity) can be differentiated by using different thresholds.

Figure 2:
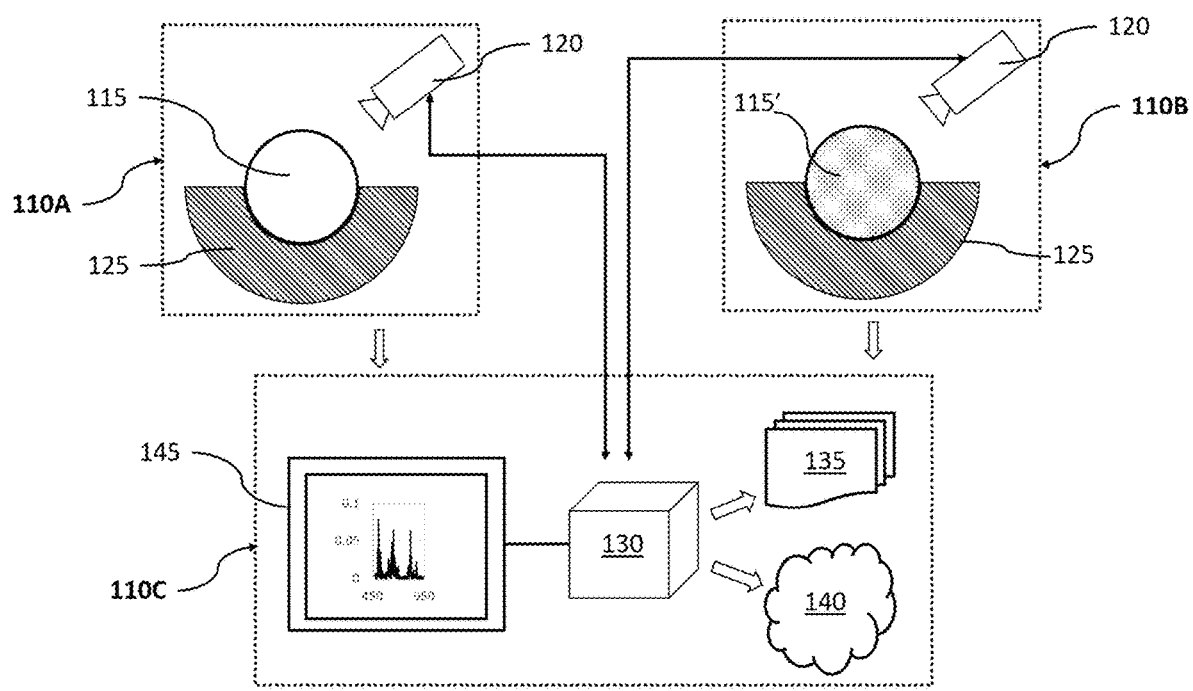
FIG. 2 is a schematic flow diagram indicating various steps of determining durability of a golf ball according to a second example.

FIG. 2 illustrates another aspect of a system and method for analyzing a golf ball. As shown in FIG. 2, step 110A includes using an imager 120 to scan a golf ball 115. The imager 120 is similar to the imager 20 as described herein with respect to FIG. 1.

Referring to FIG. 2, the golf ball 115 is pristine or new, and has not undergone any damaging treatment. Step 110B illustrates another scanning or imaging step in which the imager 120 scans the golf ball 115' (i.e., the same golf ball 115 after it has undergone a damaging treatment). Step 110C illustrates an additional step in which information, files, images, or other data is transmitted between the imager 120 and the computing system 130. The computing system 130 is similar to the computing system 30 as described herein with respect to FIG. 1. The computing system 130 is connected to a display 145, which is similar to the display 45 as described herein with respect to FIG. 1. The computing system 130 in FIG. 2 is configured to generate reports 135, such as test reports including a durability score or rating, charts, graphs, three-dimensional mappings, datasets, or other information, as well as being configured to communicate via a network 140.

The computing system 130, like computing system 30, can include any electronic components or features, including data and/or memory storage units, semiconductors, circuitry, etc. Data can be stored, transmitted, or otherwise used via the computing system 130 through any type of computer readable storage and transmission medium. The computing system 130 can include user interface components, such as a keyboard, mouse, touch pad or screen, etc. The computing system 130 can be configured to store data or information on hard drives or disks, random access memory (RAM), read only memory (ROM), portable hard drives, memory storing devices, USB drives, etc. A network interface can be provided such that the computing system 130 can communicate with external computing devices or other electronic devices. The computing system 130 can be configured to execute software, programming languages, source codes, object codes, or other instructions. Controllers, processing units, and other electronic components can be integrated with the computing system 130.

The imager 120, holder 125, computing system 130, and display 145 are essentially identical to the imager 20, holder 25, computing system 30, and display 45, respectively, unless specified otherwise herein.

Based on the concept of using a difference image, the height of any damage to the golf ball can reliably and accurately be detected or ascertained. The difference image can be produced by scanning the golf ball before it is damaged, damaging the golf ball as described above in the area that was scanned, and scanning the golf ball again. The second image or scan can be taken in the exact same area as the first image or scan.

Alternatively, the images can be offset from each other, and post-processing of the images can be performed to align the two images such that the orientations match up and a difference image can be obtained. Markings or fixtures can be used to try to orient the golf ball in the same position between the first and second images or scans. In another aspect, the alignment between two images from two orientations can be performed using software, programming, or other solution. For example, an image processing module or preprocessing module (such as an image alignment module, software, program, or other feature) can be used to ensure two input images or input files are identically aligned or oriented such that a difference analysis can be accurately carried out. In one aspect, the image processing module can resolve or reconcile the difference in the orientations in the images such that a difference image analysis can be performed. Exemplary software solutions, programs, or modules for executing this preprocessing and image alignment process can include but is not limited to MVtec HALCON® from MVtec Software GmbH, VisionPro® from Cognex®, Matrox® Imaging Library (MIL) from Matrox® Imaging, MATLAB® Image Processing Toolbox from MathWorks®, etc. U.S. Pat. No. 6,594,623, which is fully incorporated by reference as if fully set forth herein, discloses a method and system for determining orientations of objects. One exemplary technique for resolving any differences in the orientations can utilize the golf ball dimple pattern to electronically or digitally align the images. Another exemplary technique can rely on the markings or fixtures, such as specific indentations or protrusions, that are applied to the golf ball surface prior to imaging. In one example, ink markings can be applied to the golf ball for orientation purposes.

In one example, the images may be aligned by applying a low pass filter to at least the damaged image, locating the center of the golf ball, transposing at least one of the images to make the centers coincide between the damaged image and the original image, creating a three-dimensional pattern using one of the images, locating that pattern in the other image, and/or rotating at least one of the images about at least one, two, or three mutually perpendicular axes to align the patterns. One of ordinary skill in the art would understand that various types of image alignment or reconciliation techniques can be used.

Once the second image or scan is obtained, the first image or scan can be subtracted or removed from the second image or scan, thereby leaving only the damage to the golf ball in the difference image. Other pre-existing features on the golf ball, such as dimple patterns, curvature of the golf ball, and inherent features that may have manifested on the golf ball during production, such as paint defects or hob codes, will not appear in the difference image because these features are present in both the first and second images or scans. This particular configuration is advantageous because the height of the damage can be measured directly and the height can be used to grade the severity of the damage.

Figure 7A:
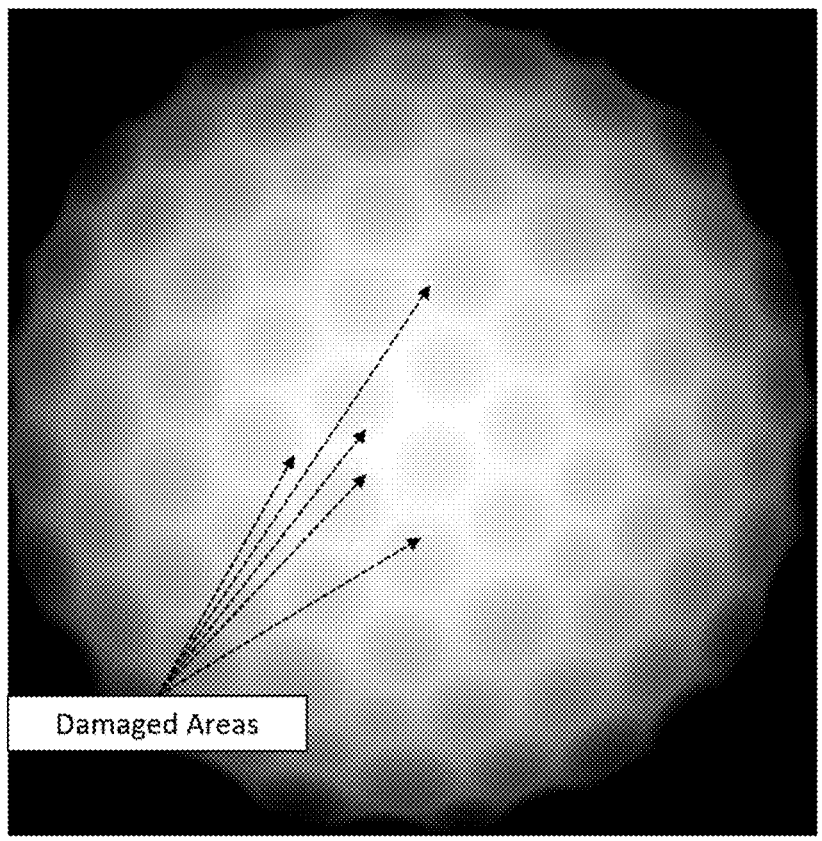
FIG. 7A is a difference image of a golf ball according to one aspect.
Figure 7B:
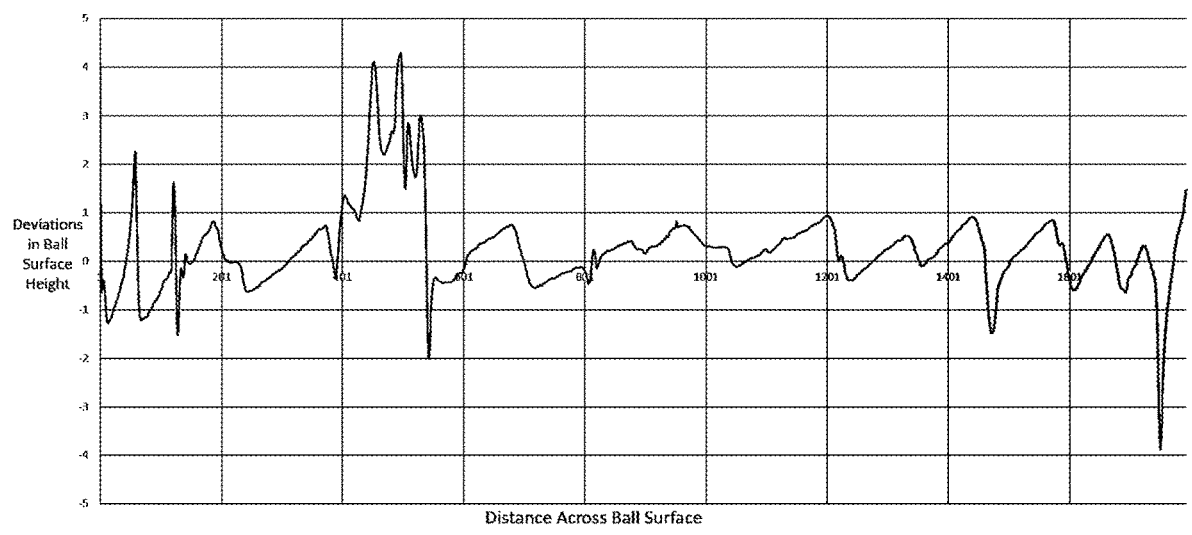
FIG. 7B is a plot illustrating deviations in the height of a portion of a golf ball surface from the image in FIG. 7A.

FIG. 7A illustrates one exemplary difference image of a golf ball surface. The difference image of FIG. 7A can be generated or obtained based on two base or initial images. A first base image or initial image can be obtained, such as via scanning, of a golf ball surface in a first state. The first state can correspond to an undamaged state. The first state can correspond to an initial state of the golf ball immediately following manufacturing and finishing processes. A second base image or final image can be obtained, such as via scanning, of the same golf ball surface as the first base image or initial image but only after applying a damaging treatment to the golf ball. The damaging treatment can be configured to simulate use of the golf ball, in one aspect. The second base or final image can be taken after intentionally applying strikes, impacts, or other blunt forces to the golf ball. After the two images (i.e., the first and second images) are obtained, then a difference image can be generated that is based on the two images. One of ordinary skill in the art would understand that the first and second images can include corresponding height deviation plots or graphs, data files, and other information. In one example, the VR series scanner and imaging solutions from Keyence Corporation can include functionality to create a difference image. Difference imaging functions or techniques can be integrated in preprocessing or machine vision tools, components, software, etc. FIG. 7B illustrates a graphical plot of the golf ball surface that is shown in FIG. 7A. In FIG. 7B, the y-axis includes units that are scaled to thousandths of an inch, such that "1" corresponds to 0.001 inches, "2" corresponds to 0.002 inches, etc.

Figure 8A:
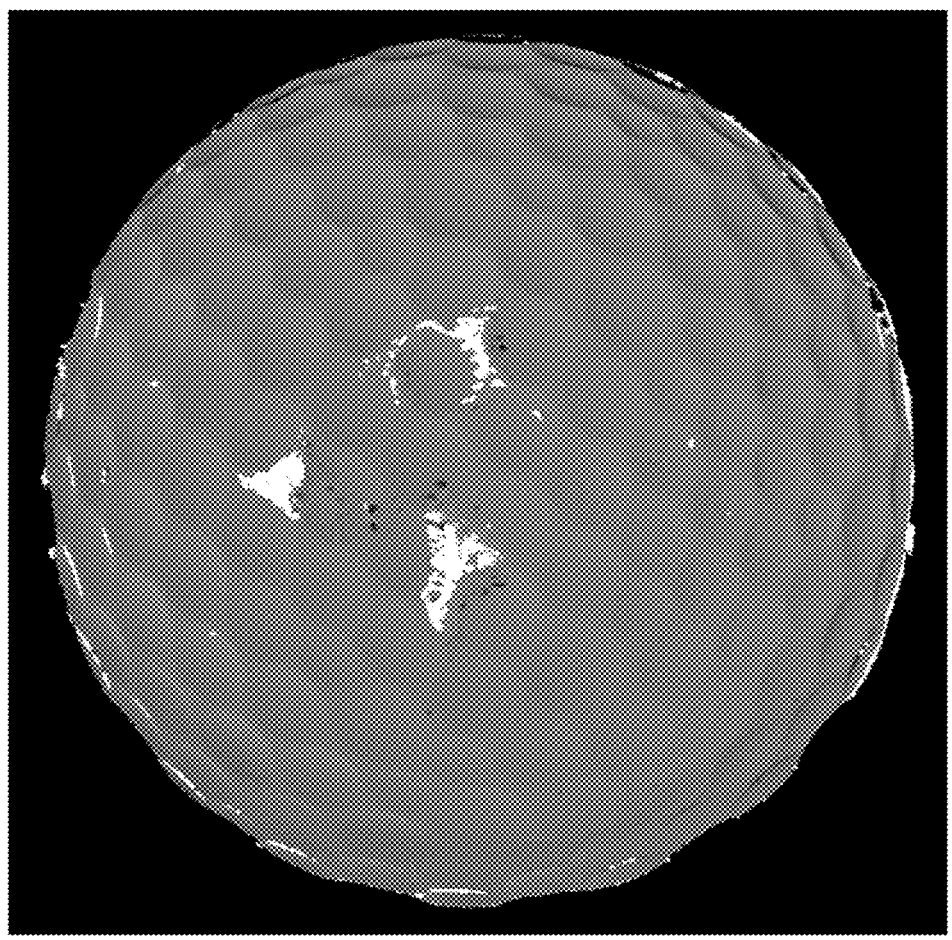
FIG. 8A is a difference image of a golf ball according to another aspect.
Figure 8B:
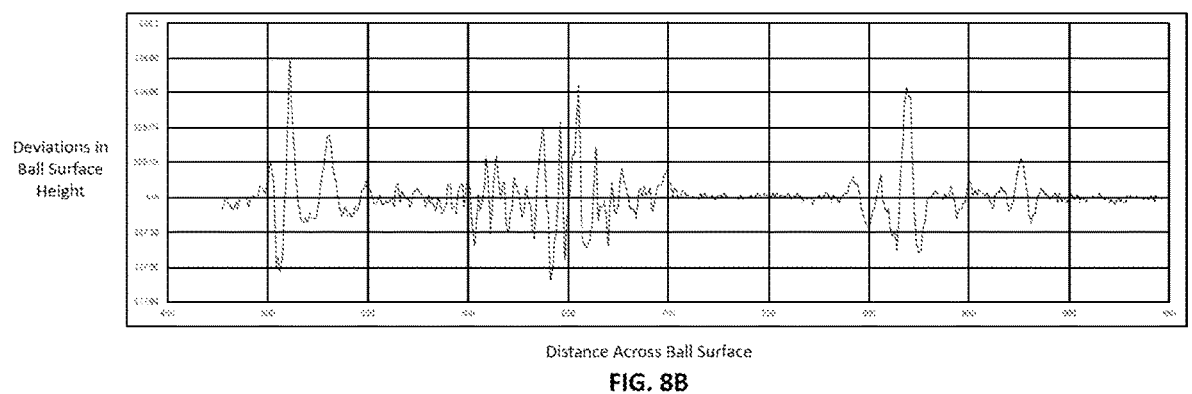
FIG. 8B is a plot illustrating deviations in the height of a portion of a golf ball surface relative to a baseline height.

FIGS. 8A and 8B correspond to yet another aspect of the present disclosure. Referring to FIGS. 8A and 8B, the present disclosure provides an aspect in which the system or method can detect and identify increases and decreases in height along the golf ball surface, as opposed to an absolute deviation in the height of the golf ball surface. In this way, the present disclosure provides a solution to identify raised material and nicks, or cuts along the golf ball surface. This aspect can be used in conjunction with a high-pass filtered technique, difference image technique, and/or any other technique or features described herein.

FIG. 8B illustrates a graphical plot of the golf ball surface that is shown in FIG. 8A. In FIG. 8A, damage that corresponds to a negative height deviation in the golf ball is illustrated via white portions on the golf ball surface and damage that corresponds to a positive height deviation in the golf ball is illustrated via black portions on the golf ball surface. One of ordinary skill in the art would understand that other colors or identifying characteristics could be used. As shown in FIG. 8B, certain portions of the plot are above the predetermined threshold (i.e., 128), and certain portions of the plot are below the predetermined threshold. Any portions of the plot that are above 128 correspond to raised portions of the golf ball surface, while any portions of the plot that are below 128 correspond to depressed portions of the golf ball surface. The present disclosure thereby provides a solution for indicating the positive or negative height deviations along a golf ball surface. In one aspect, the value of 128 in FIG. 8B is a reference of base height of the golf ball surface, and therefore the value of 128.02 and 127.98 correspond to a respective positive or negative 0.02 inch deviation in the base height, 128.04 and 127.96 correspond to a respective positive or negative 0.04 inch deviation in the base height, etc.

In one aspect, a scale, such as a two-bit scale, four-bit scale, eight-bit scale, sixteen-bit scale, thirty-two-bit scale, etc., can be used to analyze images obtained via the scanner or imager. The scale can be calibrated such that data or values above a certain threshold receive a first identifying characteristic, and data or values below a certain threshold receive a second identifying characteristic. Based on this configuration, relative values above and below the threshold can be more easily and quickly identified. The threshold value can be selected based on the color of the golf ball surface in areas that do not indicate any damage. The threshold value can be based on a difference image between a first image of an undamaged golf ball and a second image of a damaged golf ball. For example, any portions of the image that are above the threshold, which can be a value of 128, can be assigned a first indicator, such as a first color (i.e., blue). Any portions of the image that are below the threshold of 128 can be assigned a second indicator, such as a second color (i.e., red). Based on this configuration, a user can readily identify regions or areas of the golf ball surface that have raised portions (i.e., bumps, tears splaying outward, etc.) and depressed portions (i.e., cuts into the golf ball surface or material, nicks, etc.).

Figure 9:
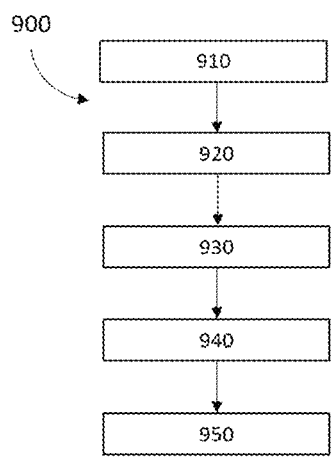
FIG. 9 is a flow diagram of a method according to one aspect.
Figure 10:
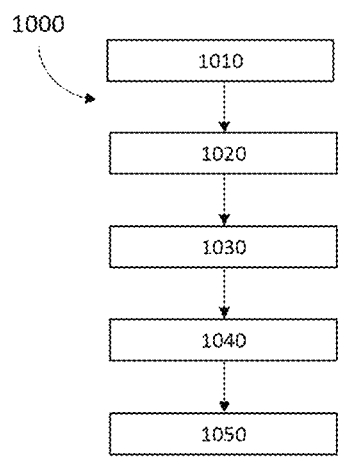
FIG. 10 is a flow diagram of a method according to another aspect.

FIGS. 9 and 10 illustrate exemplary flow diagrams for methods of analyzing a golf ball surface. In disclosed embodiments, one or more steps of the methods relating to FIGS. 9 and 10 may be completed by a computing system, such as computing system 30 and/or computing system 130. For example, a processor may execute instructions stored in a memory unit in order to complete one or more preprocessing or processing steps of these methods. In some embodiments, a hardware and/or software module, such as a preprocessing module or machine vision component cause a processor to execute the instructions to perform one or more steps of a disclosed method. Other steps can be carried out via imagers 20, 120, and/or any other components described herein.

As shown in FIG. 9, one method 900 can include intentionally damaging a golf ball, such as a golf ball surface, at step 910. This step can be carried out according to the processes or techniques described herein. Next, the method 900 includes a computing device or system and/or imager obtaining an image of the golf ball surface at step 920. The image of the golf ball surface can include any data, information, plot, graph, or other features or elements described herein. The method 900 then includes the computing device or system applying image or data processing techniques to the image at step 930. This step can be carried out, for example, via a machine vision module, software, or other feature. Other features or elements described herein can perform step 930. Next, the method 900 includes the computing device or system quantifying, classifying, analyzed, or otherwise processing data associated with the damage inflicted on the golf ball surface at step 940. The method 900 then includes the computing device or system assigning a durability rating to the golf ball at step 950. The durability rating can include any of the features or elements described herein. Step 950 can be based on an objective, predetermined set of parameters and thereby does not involve subjective user-based analysis.

As shown in FIG. 10, one method 1000 can include obtaining a first image of a golf ball at step 1010. Next, the method 1000 includes intentionally applying a damaging treatment to the golf ball at step 1020. Step 1030 then includes obtaining a second image of the golf ball, such as via an imager and/or computing system. In one example, the two images can be aligned with each other, either via manual alignment or electronic means. Step 1040 then includes applying image or data processing techniques to the first and second images, such as comparing the two images to obtain a difference image. This step can be carried out, in one example, via a computing system or device. Next, the method 1000 includes assigning a durability rating to the golf ball based on the damage as revealed by the difference image at step 1050. The durability rating can include any of the features or elements described herein. Step 1050 can be based on an objective, predetermined set of parameters and thereby does not involve subjective user-based analysis.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A method of determining durability of a golf ball having an outer surface with a plurality of dimples, the method comprising:
   (i) applying a damaging treatment to the golf ball to mar at least a portion of the outer surface of the golf ball;
   (ii) scanning the outer surface of the golf ball via an imager to acquire at least one first initial image of the golf ball;
   (iii) applying a high-pass filter function via a computing system to the at least one first initial image to generate at least one first filtered image; and
   (iv) determining the durability of the golf ball via the computing system based on an extent of marring in the at least one first filtered image.

2. The method according to claim 1, wherein the high-pass filter function is configured to:
   attenuate signals associated with a first subset of surface height deviations due to dimples and curvature of the golf ball; and
   pass through signals associated with a second subset of surface height deviations due to marring from the damaging treatment.

3. The method according to claim 1, further comprising applying a plurality of threshold settings via the computing system to the at least one first filtered image, each of the plurality of threshold settings having a different threshold such that varying damage conditions are visible based on the plurality of threshold settings.

4. The method according to claim 3, wherein the plurality of threshold settings comprises at least:
   a first threshold setting corresponding to a lowest damage condition,
   a second threshold setting corresponding to a low-moderate damage condition,
   a third threshold setting corresponding to a high-moderate damage condition, and
   a fourth threshold setting correspond to a highest damage condition.

5. The method according to claim 4, wherein step (iv) further comprises assigning a durability grade via the computing system based on a quantity of discrete areas of the golf ball surface within a respective one of the first, second, third, and fourth threshold settings.

6. The method according to claim 1, further comprising determining at least one of the following durability parameters via the computing system based on the at least one first filtered image:
   a total size of the damaged areas on the golf ball,
   a quantity of discrete damaged areas on the golf ball, or
   a single largest damaged area size on the golf ball.

7. The method according to claim 6, wherein step (iv) further comprises assigning a durability grade via the computing system based on the durability parameters.

8. The method according to claim 1, wherein the imager has a resolution of at least 0.001 inches per pixel and 0.001 inches per unit change in brightness.

9. The method according to claim 1, wherein the imager is a three-dimensional measurement imager.

10. A method of determining durability of a golf ball having an outer surface with a plurality of dimples, the method comprising:
   (i) obtaining a first image of the outer surface of the golf ball via an imager;
   (ii) applying a damaging treatment to the golf ball sufficient to mar the outer surface of the golf ball;
   (iii) obtaining a second image of the outer surface of the golf ball via the imager;
   (iv) generating at least one difference image based on a comparison between the first image and the second image via a computing system; and
   (v) determining the durability of the golf ball via the computing system based on the at least one difference image.

11. The method according to claim 10, further comprising positioning the golf ball in a holder in an identical orientation during steps (i) and (iii).

12. The method according to claim 10, further comprising applying orientation markings to the golf ball prior to step (i).

13. The method according to claim 10, wherein step (v) further comprises:
   determining at least one of the following durability parameters via the computing system based on the at least one difference image:
      a total size of the damaged area on the golf ball,
      a quantity of discrete damaged areas on the golf ball, or
      a single largest damaged area size on the golf ball; and
   assigning a durability grade based on the durability parameters.

14. The method according to claim 10, wherein the first image is from a first orientation, and the second image is from a second orientation.

15. The method according to claim 14, wherein the first and second orientations are identical.

16. The method according to claim 14, wherein the first and second orientations are different, the method further comprising reconciling the first image and the second image via the computing system to align the first and second orientations prior to step (iv).

17. The method according to claim 16, further comprising aligning the first and second images electronically via the computing system based on at least one of: a dimple pattern of the golf ball, or orientation markings disposed on the golf ball.

18. A method of determining durability of a golf ball having an outer surface with a plurality of dimples, the method comprising:
   (i) applying a damaging treatment to the golf ball to mar at least a portion of the outer surface of the golf ball;
   (ii) scanning the outer surface of the golf ball via an imager to acquire at least one first initial image of the golf ball;
   (iii) applying a high-pass filter function via a computing system to the at least one first initial image to generate at least one first filtered image, wherein the high-pass filter function is configured to:
      attenuate signals associated with a first subset of surface height deviations due to dimples and curvature of golf ball; and
      pass through signals associated with a second subset of surface height deviations due to marring from the damaging treatment;
   (iv) determining durability of the golf ball via the computing system based on an extent of marring in the at least one first filtered image; and
   (v) assigning a durability grade via the computing system based on the durability of the golf ball.

19. The method according to claim 18, further comprising applying a plurality of threshold settings to the at least one first filtered image via the computing system, each of the plurality of threshold settings having a different threshold such that varying degrees of marring can be identified based on the plurality of threshold settings.

20. The method according to claim 18, wherein the extent of marring is based on a plurality of parameters including at least one of:
   a total size of the damaged area on the golf ball,
   a quantity of discrete damaged areas on the golf ball, or
   a single largest damaged area size on the golf ball.

\* \* \* \* \*